(12) United States Patent
Oara et al.

(10) Patent No.: US 11,620,454 B2
(45) Date of Patent: *Apr. 4, 2023

(54) SYSTEM AND METHOD FOR DETERMINING AND REPRESENTING A LINEAGE OF BUSINESS TERMS AND ASSOCIATED BUSINESS RULES WITHIN A SOFTWARE APPLICATION

(71) Applicant: Hatha Systems, LLC, Washington, DC (US)

(72) Inventors: Ioan Mihai Oara, Raleigh, NC (US); Mikhail Bulyonkov, Novosibirsk (RU)

(73) Assignee: HATHA SYSTEMS, LLC, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/388,491

(22) Filed: Jul. 29, 2021

(65) Prior Publication Data

US 2021/0357593 A1 Nov. 18, 2021

Related U.S. Application Data

(63) Continuation-in-part of application No. 17/168,859, filed on Feb. 5, 2021, now Pat. No. 11,348,049, and a continuation-in-part of application No. 17/168,854, filed on Feb. 5, 2021, now Pat. No. 11,307,828, and a continuation-in-part of application No. 17/013,130, filed on Sep. 4, 2020, now Pat. No. 11,288,043, said application No. 17/168,854 is a continuation-in-part
(Continued)

(51) Int. Cl.
*G06F 40/30* (2020.01)
*G06F 8/41* (2018.01)
*G06F 40/284* (2020.01)

(52) U.S. Cl.
CPC .............. *G06F 40/30* (2020.01); *G06F 8/425* (2013.01); *G06F 40/284* (2020.01)

(58) Field of Classification Search
CPC ......... G06F 40/30; G06F 40/284; G06F 8/425
USPC .................................................. 717/104–141
See application file for complete search history.

(56) References Cited

U.S. PATENT DOCUMENTS

| 5,481,741 A | 1/1996 | McKaskle et al. |
| 5,999,911 A | 12/1999 | Berg et al. |

(Continued)

OTHER PUBLICATIONS

Tan et al, "A Column-Level Data Lineage Processing System Based on Hive", ACM, pp. 47-52 (Year: 2020).*

(Continued)

*Primary Examiner* — Anil Khatri
(74) *Attorney, Agent, or Firm* — Nelson Mullins Riley & Scarborough LLP; Anthony A. Laurentano

(57) ABSTRACT

A system and method for identifying the paths or connections (i.e., term lineage) through which the values of business terms move or flow through a single software application. The term lineage identification system and method identifies the business terms from a data model extracted from source code, and then generates an enriched architecture diagram therefrom. The operator then selects one or more business terms that form part of a term lineage project, and then the system, based on the selection, generates or creates a term lineage diagram so as to discover and view the term lineage of the selected business terms.

42 Claims, 10 Drawing Sheets

Related U.S. Application Data of application No. 17/013,130, filed on Sep. 4, 2020, said application No. 17/168,859 is a continuation-in-part of application No. 17/013,130, filed on Sep. 4, 2020.

(60) Provisional application No. 62/970,368, filed on Feb. 5, 2020, provisional application No. 62/970,556, filed on Feb. 5, 2020, provisional application No. 62/970,466, filed on Feb. 5, 2020.

(56) References Cited

U.S. PATENT DOCUMENTS

| | | | |
|---|---|---|---|
| 6,038,538 | A | 3/2000 | Agrawal et al. |
| 6,278,977 | B1 | 8/2001 | Agrawal et al. |
| 6,308,224 | B1 | 10/2001 | Leymann et al. |
| 6,598,219 | B1 | 7/2003 | Lau |
| 6,910,204 | B1 | 6/2005 | Rossomando |
| 6,964,034 | B1 | 11/2005 | Snow |
| 7,003,766 | B1 | 2/2006 | Hong |
| 7,139,999 | B2 | 11/2006 | Bowman-Amuah |
| 7,149,734 | B2 * | 12/2006 | Carlson ............... G06F 8/36 |
| 7,210,117 | B2 | 4/2007 | Kudukoli et al. |
| 7,331,037 | B2 | 2/2008 | Dickey et al. |
| 7,334,216 | B2 | 2/2008 | Molina-Moreno et al. |
| 7,404,177 | B1 | 7/2008 | Greenfield et al. |
| 7,448,022 | B1 | 11/2008 | Ram et al. |
| 7,631,006 | B2 | 12/2009 | Hagstrom et al. |
| 7,702,605 | B2 | 4/2010 | Friedlander et al. |
| 7,712,073 | B1 | 5/2010 | Srinivasan et al. |
| 7,730,446 | B2 | 6/2010 | Anonsen et al. |
| 7,814,427 | B2 | 10/2010 | Cook et al. |
| 7,992,130 | B2 * | 8/2011 | Bozza ............... G06F 9/449 717/115 |
| 8,001,552 | B1 | 8/2011 | Chickneas |
| 8,065,655 | B1 | 11/2011 | Deo et al. |
| 8,065,658 | B1 | 11/2011 | Bali et al. |
| 8,234,621 | B2 | 7/2012 | Killisperger et al. |
| 8,271,943 | B2 | 9/2012 | Hudson, III |
| 8,423,951 | B1 | 4/2013 | Koller |
| 8,423,952 | B2 | 4/2013 | Bogl et al. |
| 8,527,443 | B2 | 9/2013 | B'Far et al. |
| 8,560,956 | B2 | 10/2013 | Curtis et al. |
| 8,630,969 | B2 * | 1/2014 | Ziegler ............... G06Q 10/06 706/47 |
| 8,677,318 | B2 * | 3/2014 | Mohindra ............ G06F 9/5055 717/121 |
| 8,719,773 | B2 | 5/2014 | Slone et al. |
| 8,813,022 | B2 * | 8/2014 | Rallapalli ........... G06Q 10/067 717/102 |
| 8,904,342 | B2 | 12/2014 | Bauder et al. |
| 8,935,654 | B2 * | 1/2015 | Sengupta ........... G06F 11/3684 717/124 |
| 8,984,490 | B1 * | 3/2015 | Dahan .............. G06F 11/3466 717/127 |
| 9,047,165 | B1 * | 6/2015 | Mosterman ............ G06F 8/35 |
| 9,189,203 | B1 | 11/2015 | Hadar et al. |
| 9,256,485 | B1 * | 2/2016 | Moore ............... G06F 9/546 |
| 9,268,849 | B2 | 2/2016 | Siedlecki et al. |
| 9,400,637 | B1 * | 7/2016 | Hadar .................. G06F 8/20 |
| 9,436,760 | B1 | 9/2016 | Tacchi et al. |
| 9,576,017 | B2 | 2/2017 | Kummer et al. |
| 9,760,592 | B2 | 9/2017 | Huang et al. |
| 9,940,222 | B2 * | 4/2018 | Li ................. G06F 11/3684 |
| 9,965,252 | B2 | 5/2018 | Bera et al. |
| 10,379,826 | B1 | 8/2019 | Klinger et al. |
| 10,452,366 | B2 | 10/2019 | Daniel et al. |
| 10,635,566 | B1 * | 4/2020 | Talluri ............... G06F 9/4488 |
| 10,678,522 | B1 * | 6/2020 | Yerramreddy .......... G06F 8/10 |
| 11,144,289 | B1 * | 10/2021 | Hwang ............... G06N 5/022 |
| 11,244,364 | B2 | 2/2022 | Yu |
| 11,288,043 | B2 | 3/2022 | Oara |
| 11,307,828 | B2 | 4/2022 | Oara |
| 11,314,489 | B1 * | 4/2022 | Chartrand ............. G06F 8/36 |
| 11,348,049 | B2 * | 5/2022 | Oara ............... G06Q 10/0633 |
| 2003/0171947 | A1 | 9/2003 | Ledford et al. |
| 2004/0088197 | A1 | 5/2004 | Childress et al. |
| 2004/0088678 | A1 | 5/2004 | Litoiu et al. |
| 2009/0241088 | A1 | 9/2009 | Dangeville et al. |
| 2012/0159427 | A1 | 6/2012 | Oara et al. |
| 2012/0272205 | A1 | 10/2012 | Fox et al. |
| 2013/0047090 | A1 | 2/2013 | Bhandarkar et al. |
| 2013/0054627 | A1 | 2/2013 | Rausch et al. |
| 2014/0282199 | A1 | 9/2014 | Basu et al. |
| 2015/0012329 | A1 | 1/2015 | Prakash et al. |
| 2015/0248203 | A1 | 9/2015 | Srivastava et al. |
| 2015/0268955 | A1 | 9/2015 | Mehalingam et al. |
| 2015/0363197 | A1 | 12/2015 | Carback, III et al. |
| 2015/0363294 | A1 | 12/2015 | Carback, III et al. |
| 2016/0313979 | A1 | 10/2016 | Hadar et al. |
| 2017/0177309 | A1 * | 6/2017 | Bar-Or ............... G06F 8/35 |
| 2021/0240449 | A1 | 8/2021 | Oara |
| 2021/0240454 | A1 | 8/2021 | Oara |
| 2021/0241191 | A1 | 8/2021 | Oara |
| 2021/0357593 | A1 | 11/2021 | Oara et al. |

OTHER PUBLICATIONS

Woodruff et al, "Supporting Fine-Grained Data Lineage in a Database Visualization Environment", IEEE, pp. 91-102 (Year: 1997).*

Aldrich et al, "Arch Java: Connecting Software Architecture to Implementation", ACM, pp. 187-197 (Year: 2002).*

Ivkovic et al, "Tracing Evolution Changes of Software Artifacts through Model Synchronization", IEEE, pp. 1-10 (Year: 2004).*

Leonhardt et al, "Integration of Existing Software Artifacts into a View-and Change-Driven Development Approach", ACM, pp. 17-24 (Year: 2015).*

Su et al., "Leveraging Usage Data of Software Architecture Artefacts", IEEE, pp. 13-21 (Year: 2019).*

Alqahtani et al, "An Ontology-based Approach to Automate Tagging of Software Artifacts", IEEE, pp. 169-174 (Year: 2017).*

Chourey et al, "Functional Flow Diagram(FFD): Semantics for Evolving Software", IEEE, pp. 2193-2199 (2016).

Erol et al. "Combining BPM and social software: contradiction or chance?" Journal of software maintenance and evolution: research and practice 22.6-7 (2010): 449-476. Apr. 29, 2010 (Apr. 29, 2010) Retrieved on Mar. 27, 2021 (Mar. 27, 2021) from <https://onlinelibrary.wiley.com/doi/abs/10.1002/smr.460>.

Guo, "Automatic Transformation from Data Flow Diagram to Structure Chart", ACM, 44-49 (1997).

International Search Report and Written Opinion, PCT/US2021/016795, dated May 4, 2021, 13 pages.

International Search Report and Written Opinion, PCT/US2021/016796, dated Apr. 23, 2021, 11 pages.

International Search Report and Written Opinion, PCT/US2021/016799, dated Apr. 15, 2021, 15 pages.

Leon. "The future of computer-aided innovation." Computers in Industry 60.8 (2009): 539-550. Jun. 27, 2009 (Jun. 27, 2009) Retrieved on Mar. 28, 2021 (Mar. 28, 2021) from <https://www.sciencedirect.com/science/article/abs/Pii/S0166361509001286> entire document.

Meng et al, "Transformation from Data Flow Diagram to UML2.0 Activity Diagram", IEEE, pp. 1010-1014 (2010).

Chomngern. T. et al, Mobile Software Model for Web-Based Learning Using Information Flow Diagram (IFD), ACM 243-247 (2017).

Heer, J. et al, "Software Design Patterns for Information Visualization", IEEE, IEEE Transactions on Visualization and Computer Graphics, vol. 12, No. 5, Sep./Oct. 2006: 853-860 (2006).

Mitra, S. et al, "Analyzing Business Systems comprised of Rules and Processes using Decision Diagrams", 13th Innovations in Software Engineering Conference (formerly known as India Software Engineering Conference) (NEC 2020), Feb. 27-29, 2020, Jabalpur, India. ACM, New York, NY, USA, 5 pages (2020).

Van Eijndhoven, T. et al, "Achieving business process flexibility with business rules", IEEE, 12th International IEEE Enterprise Distributed Object Computing Conference, pp. 95-104 (2008).

(56) References Cited

OTHER PUBLICATIONS

Abi-Antoun et al, "Static Extraction and Conformance Analysis of Hierarchical Runtime Architectural Structure using Annotations," ACM, 321-340 (2009).
Berger et al, "Extracting and Analyzing the Implemented Security Architecture of Business Applications", IEEE, 285-294 (2013).
Caron et al, "Business rule patterns and their application to process analytics", IEEE, pp. 13-20 (2013).
Handigund et al, "An Ameliorated Methodology for the Design of Panoptic Work Process Flow Diagram", IEEE, pp. 2052-2055 (2016).
International Preliminary Report on Patentabilty, PCT/US2021/016796, dated Jul. 28, 2022, 10 pages.
Leavens et al, "Formal Semantics for SA Style Data Flow Diagram Specification Languages", ACM, pp. 526-532 (1998).
Mefteh et al, "Implementation and Evaluation of an Approach for Extracting Feature Models from Documented UML Use Case Diagrams", ACM, 1602-1609 (2015).
Sangal et al, "Using Dependency Models to Manage Complex Software Architecture", ACM, 167-176 (2005).
Sharma et al, "Extracting High-Level Functional Design from Software Requirements", IEEE, 35-42 (2009).
Ward, "The Transformation Schema: An Extension of the Data Flow Diagram to Represent Control and Timing," IEEE, pp. 198-210 (1986).

\* cited by examiner

SYSTEM AND METHOD FOR DETERMINING AND REPRESENTING A LINEAGE OF BUSINESS TERMS AND ASSOCIATED BUSINESS RULES WITHIN A SOFTWARE APPLICATION

RELATED APPLICATIONS

The present application is a continuation-in-part patent application of the three following patent applications: U.S. patent application Ser. No. 17/013,130, filed Sep. 4, 2020, and entitled System and Method For Creating A Process Flow Diagram Which Incorporates Knowledge of the Technical Implementations of Flow Nodes, which claims priority to U.S. provisional patent application 62/970,368, filed Feb. 5, 2020, U.S. provisional patent application 62/970,466, filed Feb. 5, 2020, and U.S. provisional patent application 62/970,556, filed Feb. 5, 2020; U.S. patent application Ser. No. 17/168,854, filed Feb. 5, 2021, and entitled System and Method For Creating A Process Flow Diagram Which Incorporates Knowledge of Business Rules, which is a continuation-in-part of U.S. patent application Ser. No. 17/013,130, filed Sep. 4, 2020; and U.S. patent application Ser. No. 17/168,859, filed Feb. 5, 2021, and entitled System and Method For Creating A Process Flow Diagram Which Incorporates Knowledge of Business Terms, which is a continuation-in-part of U.S. patent application Ser. No. 17/013,130, filed Sep. 4, 2020. The contents of all of the foregoing applications are incorporated herein by reference.

BACKGROUND OF THE INVENTION

The present invention is related to identifying common terms in a software application, and is specifically related to the identification of business terms in a single software application.

When analyzing a specific software application in an organization's portfolio of software applications, the question of which data is being used or is moving within the application is important in various contexts. Establishing the identity of data is very important, as the same data may be used and identified using different names within the same application. For example, a product identifier may appear as the field ProdID in one program of the application and as ProductIdentifier in another program of the application. Although the terms may appear to be different, they can be considered as embodiments of the same business term. As such, identification or discovery of the business terms requires special effort. Furthermore, it is important that the flow of data be related not to individual data elements, but to business terms.

In the context of software application maintenance, when an error is detected, a developer who attempts to correct the error may want to know where the value of data associated with the error is stored, how or where the data was retrieved (e.g., from a table), and how the value of the data associated with the error traveled or flowed from program to program within the application until the value was eventually displayed on a screen. In the context of an audit of a software application, an analyst may want to know how the data is collected and consolidated in general ledger tables. In the context of application modernization, a system operator may want to separate the paths through which the data is retrieved or updated into separate segments belonging to servers, services and client facing programs.

As the data flows from point to point between user interfaces, programs, and data stores (e.g., data lineage), it is also important to know if at certain points data is validated or calculated. This would give an operator a better idea of how data is being processed. Conventional systems are unable to properly track the flow of specific types of data within a software application.

While some conventional software analysis systems can track individual data element flows, they are not are able to properly track the flow of business terms throughout the entire application. This is the subject of this invention.

SUMMARY OF THE INVENTION

The present invention is directed to a system and method for identifying the paths or connections (i.e., term lineage) through which the values of business terms move or flow through a single software application. The term lineage identification system of the present invention identifies the business terms from a data model extracted from source code, and then the system generates an enriched architecture diagram therefrom. The operator then selects one or more business terms that form part of a term lineage project, and then the system, based on the selection, generates or creates a term lineage diagram so as to discover and view the term lineage of the selected business terms.

More specifically, term lineage identification system of the present invention identifies the paths through which the values of business terms and business rules move or flow through a software application. The system identifies the business terms and the business rules from a data model extracted from source code. The system also generates an architecture diagram of the data flow. The business terms, the business rules, and the architecture diagram are processed by an enriched application diagram unit to prepare an enriched application architecture diagram that includes the software artifacts and any associated business terms employed thereby. The software artifacts can be linked by communication arcs representing, for example, programmatic calls between the programs, access to data stores, interactions with screens, and the like. The system then allows the user to select one or more business terms of interest as part of a term lineage project, and then the system generates from the enriched architecture diagram a term lineage diagram, where the end user can view the flow of the selected business terms within the application and the identity of all of the software artifacts that employ the terms.

The present invention is directed to a system for associating one or more business terms with an architecture of a software application. The system includes a data source for storing source code data associated with the software application; a data extraction unit for extracting data from the source code data to form extracted data; an application model unit for generating an application model that includes a representation of selected data components of the extracted data and for generating application model data from the application model; a term identification unit for identifying from the application model data a plurality of business terms and generating business term data; an architecture diagram unit for generating an architecture diagram of each of a plurality of software artifacts of the software application; an enriched application architecture diagram unit for generating based on the architecture diagram and the business term data an enriched architecture diagram, wherein the enriched architecture diagram includes the architecture diagram and one or more of the plurality of business terms; a selected terms unit for allowing a user to select one or more business terms from the plurality of business terms; and a term lineage determination unit for determining a lineage in the software artifacts of the selected one or more business terms based on the enriched architecture diagram and the selected business term, wherein the lineage is representative of one or more data paths associated with the selected business term moving through the software artifacts.

The system can also include an optional rule identification unit for identifying from the application model data a plurality of business rules associated with the software application and generating business rule data. The business rule identification unit analyzes the application model data to identify selected snippets of code of the source code data which implement the plurality of business rules, and then mark the snippets of code as an embodiment of the business rules. The enriched application architecture diagram unit generates the enriched architecture diagram based on the architecture diagram, the business term data and the business rule data. The system also includes a storage unit for storing the extracted data and for providing the extracted data to the application model unit, where the storage unit includes a database for storing the extracted data and a knowledge repository for storing selected information about the software application.

According to the present invention, the representation of the selected data components of the application model can include, for example, entities, relationships or associated attributes that describe a functionality of the data components in connection with the software application. The entities can include programs, classes, statements, data elements, tables, columns, or screens, and the attributes can include associated identifying information that further specify the entity.

The term identification unit of the present invention can identify selected ones of the data components in the application model data, organize the data components into a plurality of groups in which all elements of a group refer to the same concept, and associate each of the plurality of groups with a selected business term. The architecture diagram unit can employ selected portions of the application model data to generate therefrom one or more of the architecture diagrams that indicate the relationship between the software artifacts. The enriched application diagram further comprises information about the relationships between one or more of the software artifacts and the business terms, and optionally the business rules. The enriched application architecture diagram unit or the term lineage determination unit can generate a schematic tree map showing relationships between the software artifacts and the business rules.

Further, the architecture diagram includes a plurality of programmatic boxes representative of the software artifacts that are linked together by communication arcs representing relationships between the software artifacts. The programmatic boxes are linked to at least one of a user interface, a program, or a data store that employs one of the plurality of business terms. The term lineage determination unit determines from the enriched architecture diagram a reduced architecture diagram that is representative of a path of the selected business term as the business term flows between software artifacts within the software application, where the reduced architecture diagram is representative of a lineage of the business term that flows through the software artifacts.

The present invention is also directed to a computer-implemented method for associating one or more business terms with an architecture of a software application. The method includes extracting data from source code data with a data extraction unit to form extracted data; generating an application model with an application model unit that includes a representation of selected data components of the extracted data and for generating application model data from the application model; identifying from the application model data a plurality of business terms and generating business term data using a term identification unit; generating an architecture diagram of each of a plurality of software artifacts of the software application using an architecture diagram unit; generating based on the architecture diagram and the business term data an enriched architecture diagram using an enriched application architecture diagram unit, wherein the enriched architecture diagram includes the architecture diagram and one or more of the plurality of business terms; allowing a user to select one or more business terms from the plurality of business terms with a selected terms unit; and determining a lineage in the software artifacts of the selected one or more business terms based on the enriched architecture diagram and the selected business term using a term lineage determination unit. The lineage is representative of one or more data paths associated with the selected business term moving through the software artifacts.

The method can also include identifying from the application model data a plurality of business rules associated with the software application with a rule identification unit and then generating business rule data. The enriched application architecture diagram unit can then generate the enriched architecture diagram based on the architecture diagram, the business term data and the business rule data.

The method of the present invention can also include storing the extracted data and providing the extracted data to the application model unit with a storage unit. The storage unit can include a database for storing the extracted data and a knowledge repository for storing selected information about the software application. The representation of the selected data components of the application model includes entities, relationships and associated attributes that describe a functionality of the data components in connection with the software application. The entities can include programs, classes, statements, data elements, tables, columns, or screens, and the attributes can include identifying information that further specifies the entity.

According to one aspect, with the term identification unit, identifying selected ones of the data components in the application model data, organizing the data components into a plurality of groups in which all elements of a group refer to the same concept, and associating each of the plurality of groups with a selected business term. The method can also include employing, with the architecture diagram unit, selected portions of the application model data to generate therefrom one or more of the architecture diagrams that indicate the relationship between the software artifacts. According to an optional step, the method can include analyzing, with the business rule identification unit, the application model data to identify selected snippets of code of the source code data which implement the plurality of business rules, and marking the snippets of code as an embodiment of the business rules.

The enriched application diagram further comprises information about the relationships between one or more of the software artifacts and the plurality of business terms. Further, the method includes generating, with the enriched application architecture diagram unit or the term lineage determination unit, a schematic tree map showing relationships between the software artifacts and the business terms. The architecture diagram includes a plurality of programmatic boxes representative of the software artifacts that are linked together by communication arcs representing relationships between the software artifacts. The method can also include linking one or more of the programmatic boxes to at least one of a user interface, a program, or a data store that employs one of the plurality of business terms. The method then determines from the enriched architecture diagram a reduced architecture diagram that is representative of a path of the selected business term as the business term flows between software artifacts within the software application, wherein the reduced architecture diagram is representative of a lineage of the business term that flows through the software artifacts.

The present invention can also be directed to a non-transitory, computer readable medium comprising computer program instructions tangibly stored on the computer readable medium, where the computer program instructions are executable by at least one computer processor to perform a method, the method including extracting data from source code data with a data extraction unit to form extracted data; generating an application model with an application model unit that includes a representation of selected data components of the extracted data and for generating application model data from the application model; identifying from the application model data a plurality of business terms and generating business term data using a term identification unit; generating an architecture diagram of each of a plurality of software artifacts of the software application using an architecture diagram unit; generating based on the architecture diagram and the business term data an enriched architecture diagram using an enriched application architecture diagram unit, wherein the enriched architecture diagram includes the architecture diagram and one or more of the plurality of business terms; allowing a user to select one or more business terms from the plurality of business terms with a selected terms unit; and determining a lineage in the software artifacts of the selected one or more business terms based on the enriched architecture diagram and the selected business term using a term lineage determination unit, wherein the lineage is representative of one or more data paths associated with the selected business term moving through the software artifacts.

The computer readable medium can also include identifying from the application model data a plurality of business rules associated with the software application with a rule identification unit and then generating business rule data. The enriched application architecture diagram unit can then generate the enriched architecture diagram based on the architecture diagram, the business term data and the business rule data.

The computer readable medium of the present invention can also include storing the extracted data and providing the extracted data to the application model unit with a storage unit. The storage unit can include a database for storing the extracted data and a knowledge repository for storing selected information about the software application. The representation of the selected data components of the application model includes entities, relationships and associated attributes that describe a functionality of the data components in connection with the software application. The entities can include programs, classes, statements, data elements, tables, columns, or screens, and the attributes can include identifying information that further specifies the entity.

According to one aspect, with the term identification unit, identifying selected ones of the data components in the application model data, organizing the data components into a plurality of groups in which all elements of a group refer to the same concept, and associating each of the plurality of groups with a selected business term. The computer readable medium can also include employing, with the architecture diagram unit, selected portions of the application model data to generate therefrom one or more of the architecture diagrams that indicate the relationship between the software artifacts. According to an optional step, the computer readable medium can include analyzing, with the business rule identification unit, the application model data to identify selected snippets of code of the source code data which implement the plurality of business rules, and marking the snippets of code as an embodiment of the business rules.

The enriched application diagram further comprises information about the relationships between one or more of the software artifacts and the plurality of business terms. Further, the computer readable medium includes generating, with the enriched application architecture diagram unit or the term lineage determination unit, a schematic tree map showing relationships between the software artifacts and the business terms. The architecture diagram includes a plurality of programmatic boxes representative of the software artifacts that are linked together by communication arcs representing relationships between the software artifacts. The computer readable medium can also include linking one or more of the programmatic boxes to at least one of a user interface, a program, or a data store that employs one of the plurality of business terms. The computer readable medium then determines from the enriched architecture diagram a reduced architecture diagram that is representative of a path of the selected business term as the business term flows between software artifacts within the software application, wherein the reduced architecture diagram is representative of a lineage of the business term that flows through the software artifacts.

BRIEF DESCRIPTION OF THE DRAWINGS

These and other features and advantages of the present invention will be more fully understood by reference to the following detailed description in conjunction with the attached drawings in which like reference numerals refer to like elements throughout the different views. The drawings illustrate principals of the invention.

DETAILED DESCRIPTION

Figure 1:
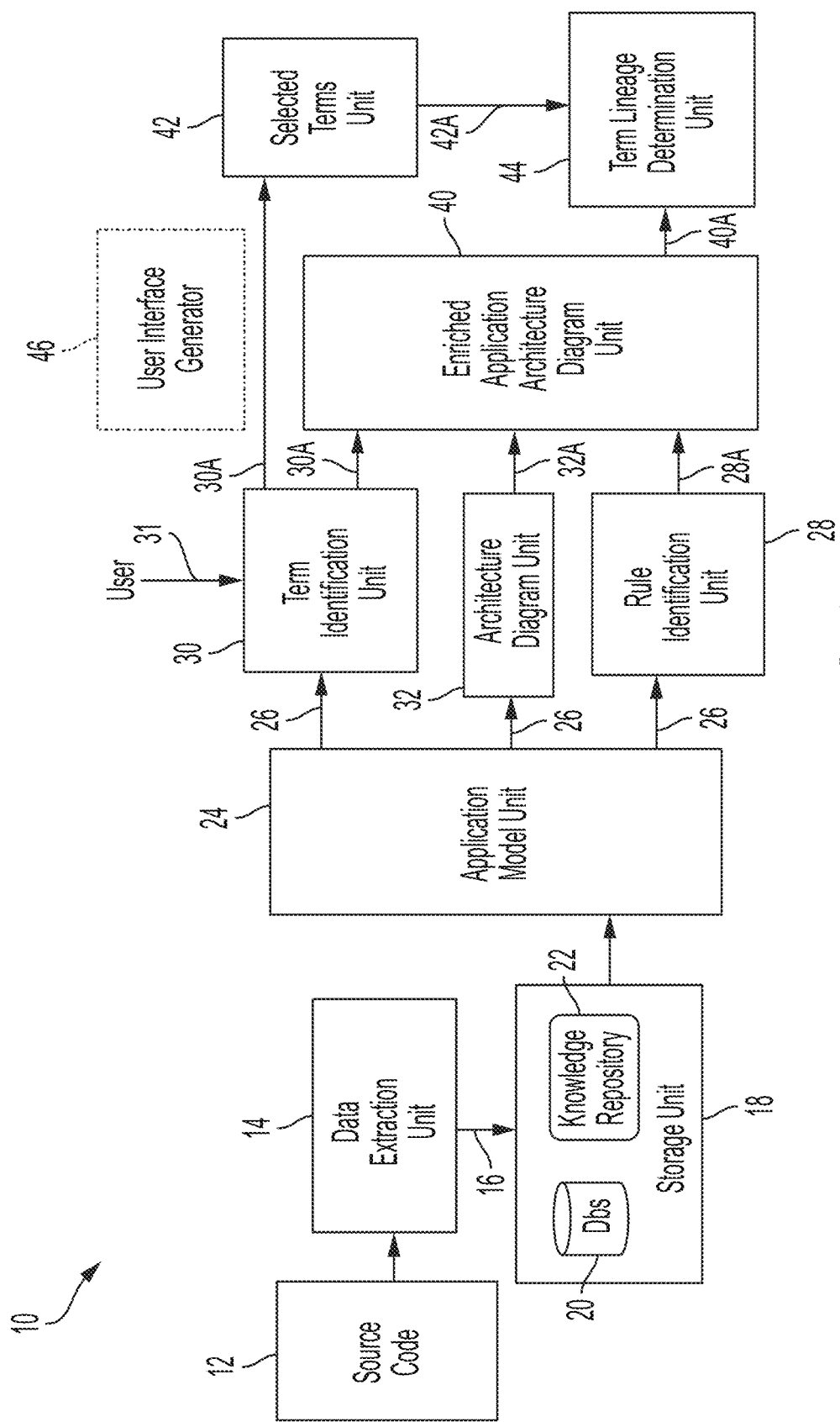
FIG. 1 is a schematic block diagram of the data identification system according to the teachings of the present invention.

The present invention is directed to a system and method for identifying the paths or connections (i.e., term lineage) through which the values of business terms move or flow through a software application according to the teachings of the present invention. The data identification system of the present invention identifies the business terms from a data model extracted from source code, and then the system generates an enriched architecture diagram therefrom. The operator then selects one or more business terms that form part of a term lineage project, and then the system, based on the selection, generates or creates a term lineage diagram so as to discover and view the term lineage of the selected business terms.

The system of the present invention also automatically discovers or determines the software artifacts, which includes user interfaces, executable programs and data stores, in which the selected business terms appear, and displays the terms to the operator. The paths of the data associated with the business terms, or term lineage, can be represented in the form of a term lineage diagram, where programmatic boxes correspond to technical artifacts and the arcs represent communications between them, such as programs programmatically calling programs, programs communicating with screens, programs accessing data stores, and the like.

The term "operator" is used to designate the human or end user who is utilizing the system and the method of the present invention.

The term "end user" is used to refer to a user of the software application or associated computer system.

The term "software artifact" or "technical artifact" is intended to include an object which plays a role in the architecture and the running of a software application, such as a user interface (e.g., a screen or a window), a program or a data store. Software artifacts are defined by the developers of the software application such that, at runtime, the artifacts combine to support the functionality of the application. In different types of technologies, the program may also be called functions, procedures, or methods.

The term "data store" as used herein is intended to include any physical or logical device which holds or stores data, including data processed by the software application. The data stores can include tables, records, segments, indexed or sequential files, and the like.

The term "user interface" as used herein refers to any software artifact in a software application, which is used to present data to an operator or end user or acquire data from an operator or end user. The user interfaces can include screens, windows, panes, forms, pages or reports.

The term "program" as used herein refers to a sequence of instructions, stored in any medium, that can be interpreted and executed by a computer to perform a specific task, and can refer to either the executable form that a computer can execute (e.g., executable code) or the human readable form (e.g., source code).

The term "application" or "software application" as used herein is intended to include a group of software artifacts which together combine to create the functionality required to run the operation of a computer system for the benefit of an end user or an organization. The application can have associated source code which can be programmatically called or can programmatically call other such procedural calls or that can communicate with a software artifact.

The term "application model" as used herein is intended to mean or include a data model consisting of entities, relationships and their associated attributes, collected through an extraction process (e.g., a reverse engineering process) and stored in selected memory or storage (e.g., files or a database). The entities can include programs, classes, statements, data elements, tables, columns, or screens. The attributes can include for example any associated identifying information, such as name, size, identification (ID) or kind that can further specify each entity. The entities may be related through relationships such as statement read fields, program update tables, program calls, and the like.

The term "business term" as used herein is intended to mean or include an abstract piece or portion of data which has a business related significance. Examples of business terms can include, without limitation, words, groups of words, phonemes, acronyms, partial words, or associated grouping or collection of letters, numbers and/or symbols. By simple way of example, the business terms can include, without limitation and for illustrative purposes, Transaction Date, Unit Price, Vendor Identification information, Customer Identification information (e.g., customer name, address, and social security number), and the like. While business terms are by their nature abstract and conceptual, they can be embodied in the software application in the form of data elements, such as fields or members in a program or a user interface or elements in a data store, such as columns or rows in a table. While intimately related to the data elements which appear in the application, a business term is not by itself construed to have a software connotation. The data elements which appear in the software application may embody or implement various business terms. Thus, a single business term may be implemented through or located in many different fields or members or data stores, and can have the same, similar, or different names. For example, in a common business-oriented language (COBOL) application, the term Transaction Date may appear to be implemented in a field called TRANSACTION-DATE, or TRANS-DT or TRANSDTI. The system and method of the present invention can locate the terms that are being used and can also determine where the terms are being implemented throughout the application. Further, the application code may use many other types of data elements which are not necessarily business terms, such as for example fields which can be used as indexes or as switches to control the execution of one or more programs.

The term "code snippet" or "snippet of code" or "snippets of code" as used herein is intended to refer to a set of contiguous statements or lines of source code (e.g., code fragments or snippets) in an application or program. The snippet or fragment can include or consist of, for instance, an IF statement together with an associated THEN and ELSE branches or statements, or a WHILE statement or any other sequence of statements.

The term "business rule" as used herein is intended to mean some particular predefined manner or way in which a software application performs, processes or treats data, and which has a business connotation. While business rules are generally conceptual in nature, in a software application they are usually implemented by some fragments or snippets of source code, which enforce the validations or execute the associated calculations. By simple way of example and for illustrative purposes only, examples of business rules can include "customer age must be at least 18", or "charge=price−discount+tax," as simple examples. A business rule discovery process involves identifying the associated business rule, but also the implementation of the rule in the source code. The same abstract rule may be implemented multiple times in the code of an application, either by reuse of the same code via programmatic calls, or by simple duplication or replication of the code.

The term "term lineage" or "lineage" as used herein refers to the data paths on which data representing selected business terms moves or flows within a software application. By way of example and without limitation, a term called "Product ID" can move or flow between different software artifacts within the same application, such as from a user interface to a number of programs via calls and to one or more data stores. As such, the lineage of the business term is representative of the communication history between various software artifacts within the same software application.

The term "term lineage diagram" is a representation or diagram illustrating or displaying or conveying information or relationships associated with one or more term lineages in the form of a diagram, in which the programmatic boxes correspond to software artifacts and the edges or connections correspond to flows of data therebetween.

The term "architecture diagram" or "architecture" as used herein is intended to include a diagrammatic representation of relationships between any combination of software artifacts (e.g., user interfaces, programs, and data stores) within a software application. The representations can indicate or show which software artifacts are communicating with each other, as well as which programs communicate with or call other programs and which programs access data stores to read, update, insert or delete data. The architecture diagram can show some or all of such relationships.

The term lineage identification system 10 of the present invention is shown for example in FIG. 1. The illustrated term lineage identification system 10 can employ one or more computing systems or one or more electronic devices that has one or more units, modules, systems, or sub-systems that are configured to implement the functionality described herein. According to the present invention, the term lineage identification system 10 helps identify the path or flow of selected data, such data or values associated with business terms and business rules, within a software application. The system 10 can also be configured to generate or create a term lineage diagram. The illustrated term lineage identification system 10 includes one or more data sources 12 for storing source code that is associated with a software application, such as for example program source code or database or screen descriptions. The data extraction unit 14 can acquire or extract selected types of information from the source code. More specifically, the data extraction unit 14 can identify and capture or extract data 16, which can include for example data elements, definitions, operations, and relationships present in a software application employed by the system 10. According to one embodiment of the present invention, the data extraction unit 14 extracts the types of data that allows the system 10 to subsequently identify, determine and represent business terms and business rules, as well as the relationship between software artifacts (e.g., user interfaces, programs and data stores). The data extraction unit 14 can be implemented using known reverse engineering methods, such as for example by using software analysis tools, and preferably software static analysis tools. Examples of suitable software static analysis tools includes Apache Yetus, Axivion Bauhaus, Coverity, and the like.

The extracted data 16 can be stored in a storage unit 18. The storage unit 18 can be any selected type of storage unit 18 as is known in the art. According to one practice, the storage unit 18 can include a database 20 for storing the extracted data 16. The database 20 can be any type of database, and is preferably a relational database. The database 20 functions as a storage device for a knowledge repository 22, which can be implemented in connection with (e.g., on top of) the database, and which can be configured to also store the extracted data 16, which can include for example data about the software artifacts, data elements and program statements. Consequently, the knowledge repository 22 can be used to store and make available for retrieval information associated with and about the software application and associated data. In particular, the knowledge repository 22 stores information about which statements appear in the application, which data elements are used in each statement, which data elements and which scripts appear on each user interface, which columns or fields appear in which data stores, which procedures are triggered by operations against tables, which programs call which programs, which programs communicate with which user interfaces, which programs access which data stores, and the like.

The term lineage identification system 10 also includes an application model unit 24 that includes all of the extracted data 16, which includes software artifacts, entities, relationships and associated attributes. As such, the application model can be employed as a convenient source of information about the software application being analyzed by the system. The entities can include programs, classes, statements, data elements, data stores such as tables, columns, or screens. The attributes can include for example any associated identifying information that can further specify the entity. The entities may be related through relationships such as statement read fields, program update tables, program calls, or program communications with for example a screen. The application model unit 24 can generate application model information 26 indicative or representative of the application model that is conveyed to other portions of the system. The application model information can include information or data associated with business terms, business rules, and architecture information including information associated with the software artifacts and the software application and associated programs.

The illustrated system 10 also includes appropriate units for the discovery of business terms, business rules, and the overall system architecture. Specifically, the system 10 can include an architecture diagram unit 32, which uses information from the application model in order to construct architecture diagrams, a term identification unit 30 for discovering or identifying business terms in the application model information 26, and an optional rule identification unit for discovering business rules in the application model information 26. As shown in FIG. 1, the application model information 26 can be conveyed or received by an architecture diagram unit 32. The architecture diagram unit 32 generates from the application model information 26 an architecture diagram that includes a representation of relationships between any combination of software artifacts (e.g., user interfaces, programs and data stores). The representations can indicate or show which program of the software application communicates with, for example, selected user interfaces, data stores, and the like. An example of a conceptual representation of the architecture diagram is shown, in part, in FIG. 6.

The system 10 also includes a business rule identification unit 28 that can identify business rules based on portions of the application model information 26 and can form a list of the business rules. The business rule identification unit 28 can analyze the data in the application model and identify selected patterns in code, such as snippets of code, which can thus be associated with one or more business rules. That is, the rule identification unit 28 identifies the business rules that are present in the applications model. According to one embodiment, the operator or user can simply employ the user interfaces of the system 10 to view and add the identified business rules thereto, and then for each business rule specify the snippets of code which embody the rules. This process, however, can be inefficient and error prone, as the user may forgot to either add business rules or fail to specify all possible embodiments of the rules. According to a more efficient implementation, the operator can start with an operator-defined code pattern (i.e., snippet of code) and the system 10 can search for the code pattern in the source code of the application. The search results in the discovery of a number of code snippets which conform to the searched pattern. The system 10 can create a business rule from each snippet of code or code snippet found by the code pattern search and then mark the code snippet as the embodiment of that business rule.

The system 10 can also include a term identification unit 30 for searching the application model information 26 received from the application model unit 24 and then searching and identifying therefrom one or more business terms according to the methodology described herein. Specifically, the information in the application model is employed by the term identification unit 30 for identifying business terms. The term identification unit 30 identifies the data elements in the software application, organizes the data elements into groups in which all elements refer to the same or similar concept, and then associates each group with a business term. By way of a simple non-limiting example, in a common business-oriented language (COBOL) application, the data elements or fields CUSTOMER-NAME, CUST-NAME, CNAME and CUSTN may refer to the same concept of a customer name. Therefore, a business term can be derived and named (e.g., customer name) from all of the foregoing data elements, and the system 10 can generate implementation relationships to each one of the different fields corresponding to the business term. Further, the system of the present invention contemplates having the user 31 optionally review the search results and then identify the data elements that should be grouped together and which can be identified with a common business term.

The term identification unit 30 then generates and conveys term data 30A to an enriched application architecture diagram unit 40. Similarly, the architecture diagram unit 32 can generate an architecture diagram 132 and can convey the architecture diagram data 32A associated with the architecture diagram 132 to the enriched application architecture diagram unit 40. Also, the rule identification unit 28 can generate and convey business rule data 28A representative of business rules to the enriched application architecture diagram unit 40. The enriched application architecture diagram unit 40 in response to the foregoing input data 28A, 30A, 32A generates an enriched architecture diagram 130 that can include the architecture diagram 132 from the architecture diagram unit 32 that is further enriched with additional information, such as for example, the business rules and business terms data from the software application. The enriched application architecture diagram unit 40 thus generates or creates an enriched architecture diagram 130 that includes or provides additional information about the relationships between the software artifacts (e.g., programs, data stores, and user interfaces) and the business rules and business terms. Example of suitable enriched architecture diagrams are shown for example in FIGS. 6, 7 and 9.

The system 10 further includes a selected terms unit 42 that also receives the term data 30A from the term identification unit 30 and then allows an operator or end user to select therefrom one or more business terms. The selected terms unit 42 generates in response to the user selection a data output 42A indicative of the business terms selected by the user for further processing by the term lineage unit 44. The term lineage unit 44 also receives the enriched architecture data 40A from the enriched application architecture diagram unit 40. In response to the received data 40A, 42A, which includes data associated with the enriched architectural diagram and the selected business terms and software artifacts, the term lineage unit 44 can generate therefrom a term lineage diagram. An example of a term lineage diagram is shown for example in FIG. 7.

The term lineage identification system 10 can also include an optional display unit having a user interface generator 46 for generating and then displaying a user interface. The operator can interact with the user interface and can select using conventional selection mechanisms (e.g., mouse, keyboard, etc.) one or more user selectable features of the present invention. For example, when the operator desires to create a lineage analysis project or generate a term lineage diagram, then the user can for example select one or more business terms for which the term lineage is to be discovered.

Figure 2:
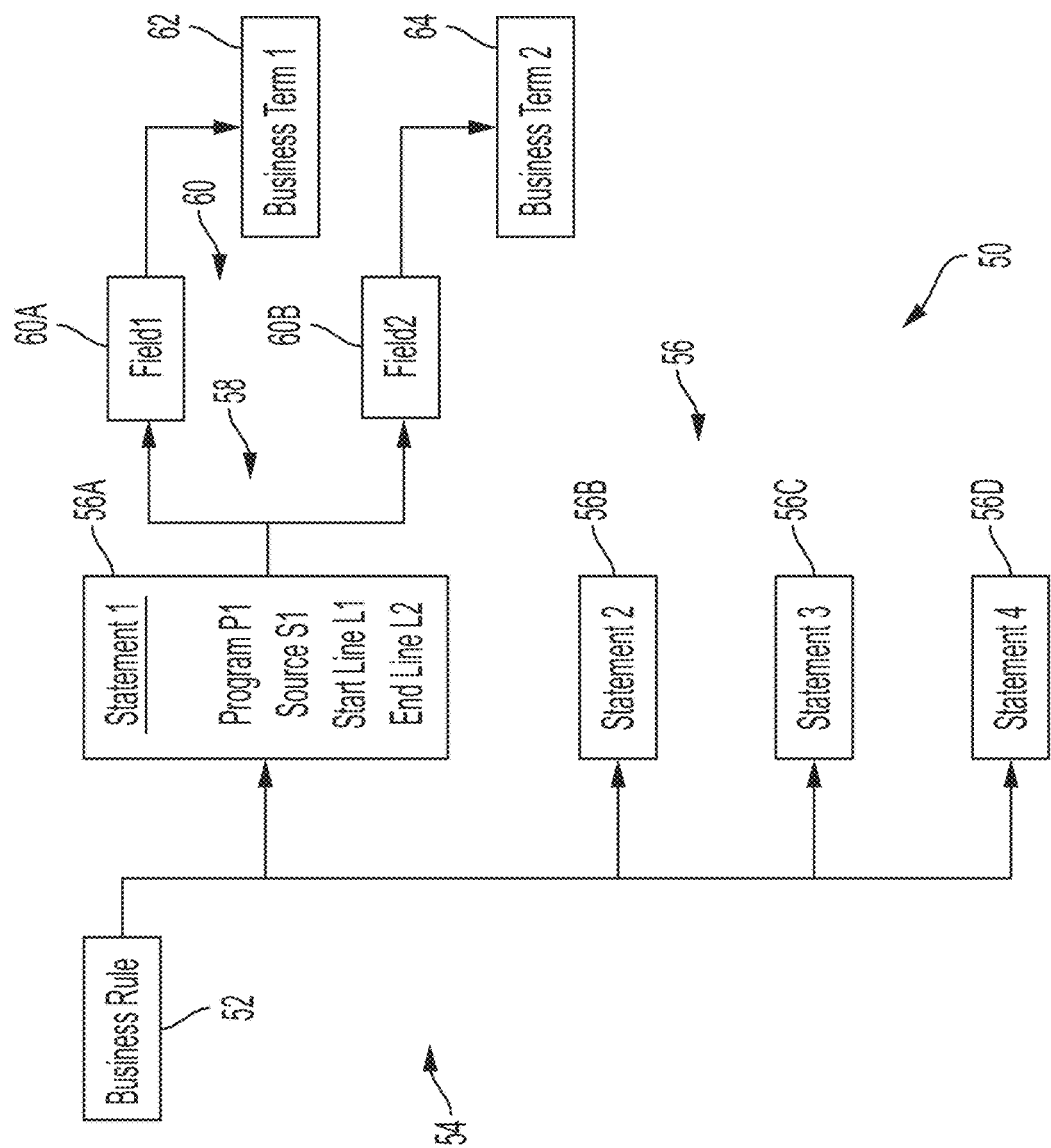
FIG. 2 is a schematic conceptual representation of the relationships between business rules and business terms as employed by the data identification system of FIG. 1 according to the teachings of the present invention.

FIG. 2 illustrates a conceptual schematic diagram 50 (e.g., tree map) generated by the enriched application architecture diagram unit 40 or the term lineage determination unit 44 showing the relationships or mapping between the business rules, the business terms, and the software artifacts. The illustrated business rule 52 that is identified by the rule identification unit 28 from the term lineage identification system 10 can be implemented by selected software code that is composed of one or more statements 56. By way of example, the illustrated business rule 52 can be composed of multiple statements 56A-56D and the business rule 52 can also include pointers 54 to the statements 56. The statements 56 can be representative of selected programs that include or employ the business rule 52 and can have selected data associated therewith, including for example, software start and end lines and an indication of the program source, as shown for example in connection with Statement 1. Each of the statements 56 in turn can have pointers 58 to selected fields 60 on which the rule operates. As shown, the statement 56A has pointers 58 to Field1 60A and to Field2 60B. The fields can be implementations of one or more business terms. That is, the statements can act on data elements in the fields which includes the business terms. For example, the Field1 60A implements and points to business term 62 and the Field2 60B implements and points to the business term 64. For instance, a business rule that computes a charge can be implemented in software code which uses variables or fields that represent selected business terms, such as price and tax. The system can then infer that the business rule can include a "computation of charge" rule and is related to the business terms "product price" and "local tax." Further, the system 10 can aggregate together the foregoing flow from the business rule to the business terms so as to determine which rules are using which business terms.

Figure 3:
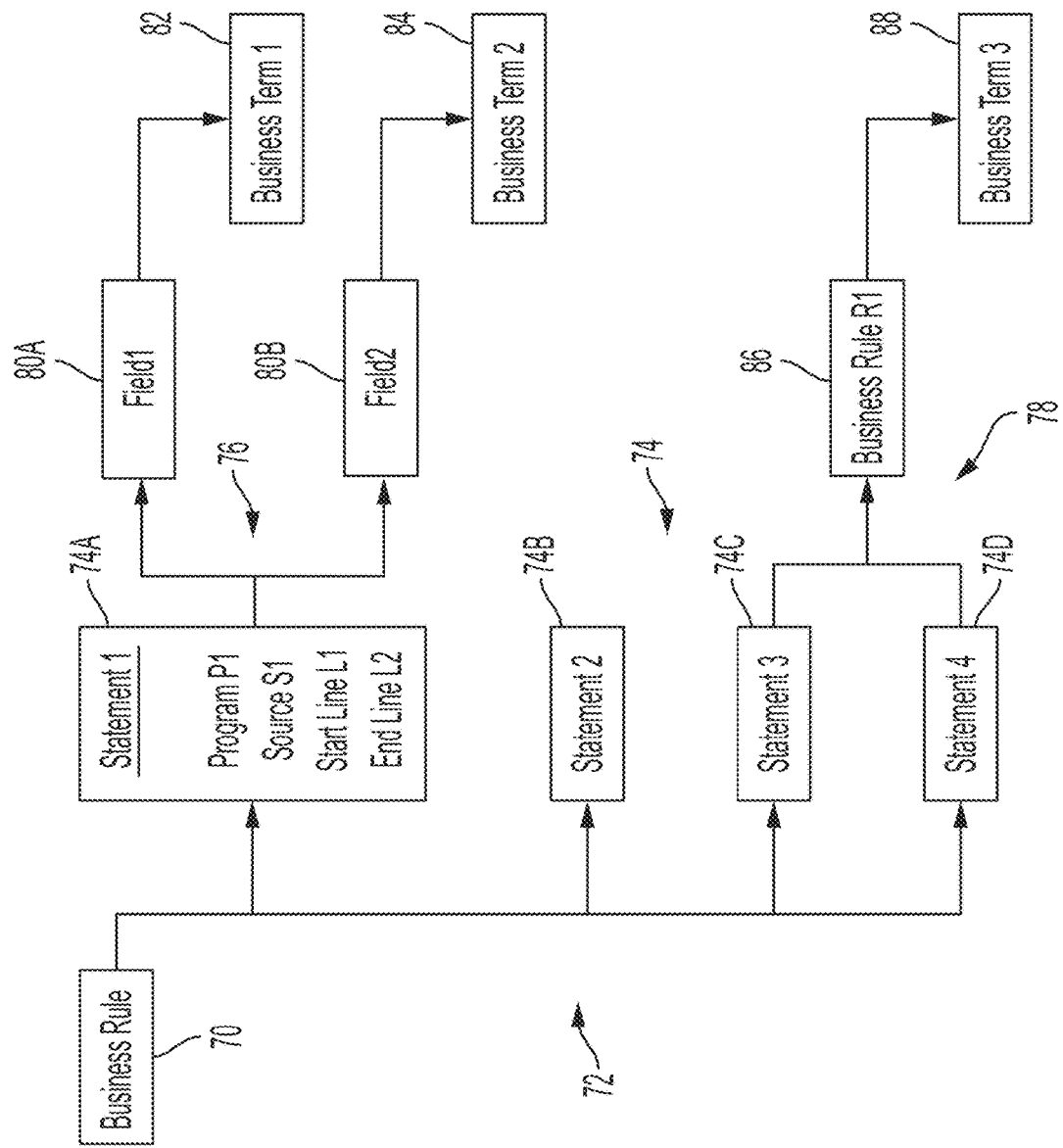
FIG. 3 is a schematic conceptual representation of the relationships between one or more programs and business rules and terms as employed by the data identification system of FIG. 1 according to the teachings of the present invention.

The term lineage identification system 10 can also determine the relationship and connection between a software artifact, such as program 70, and selected business rules and business terms, as shown for example in FIG. 3. As shown in the illustrated conceptual diagram, the program 70 has pointers 72 that point to one or more statements 74 that are implementations of business rules and/or business terms. The program 70 can also use data elements that are implementations of selected business terms. According to the illustrated example, the statements 74 include statements 74A-74D. Each of the statements, such as statement 74A, can include pointers 76 to one or more fields 80A, 80B on which the statements operate. The statement 74A can include or have associated therewith additional information, including by simple way of example program data, source program data, and code data including start and end line information. The fields 80A, 80B can include implementation information directed to selected business terms. For example, field 80A points to and implements the business term 82 and the field 80B points to and implements the business term 84. Thus, the system 10 can determine the path and relationships between the program 70 and the business terms 82, 84, as shown. Further, the statements 74C and 74D can include pointers 78 to a business rule 86, which in turn can include a pointer to a business term 88.

Figure 4:
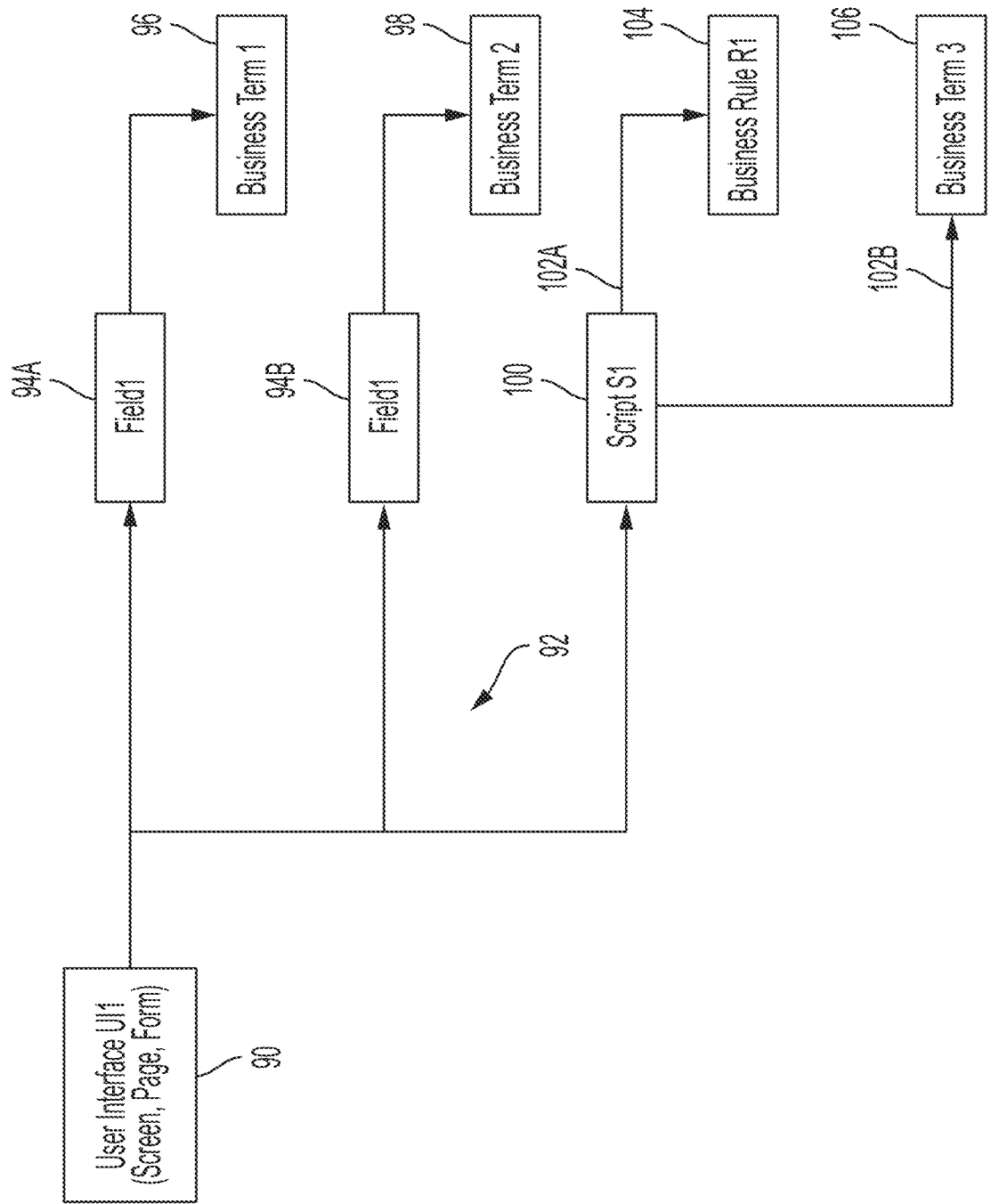
FIG. 4 is a schematic conceptual representation of the relationships between one or more user interfaces and business rules and terms as employed by the data identification system of FIG. 1 according to the teachings of the present invention.

The illustrated system 10 can also determine the relationship and connection between a software artifact, such as a user interface, and selected business rules and/or business terms. As shown in the conceptual diagram in FIG. 4, the illustrated diagram shows the relationships between a user interface and one or more business rules and business terms. The illustrated user interface 90 has pointers 92 to a number of fields 94A, 94B in which information is displayed or entered. For example, the field 94A can include implementation information directed to business term 96 and the field 94B can include implementation information directed to business term 98. As such, the system 10 is able to determine the business terms associated with a selected user interface. Further, the user interface 90 can also employ a software script 100, such as JavaScript, that contains code that executes or implements a business rule or business term. Specifically, the script 100 can include pointers to business rules and/or business terms. For example, the script 100 can include a pointer 102A to a business rule 104 and a pointer 102B to a business term 106.

Figure 5:
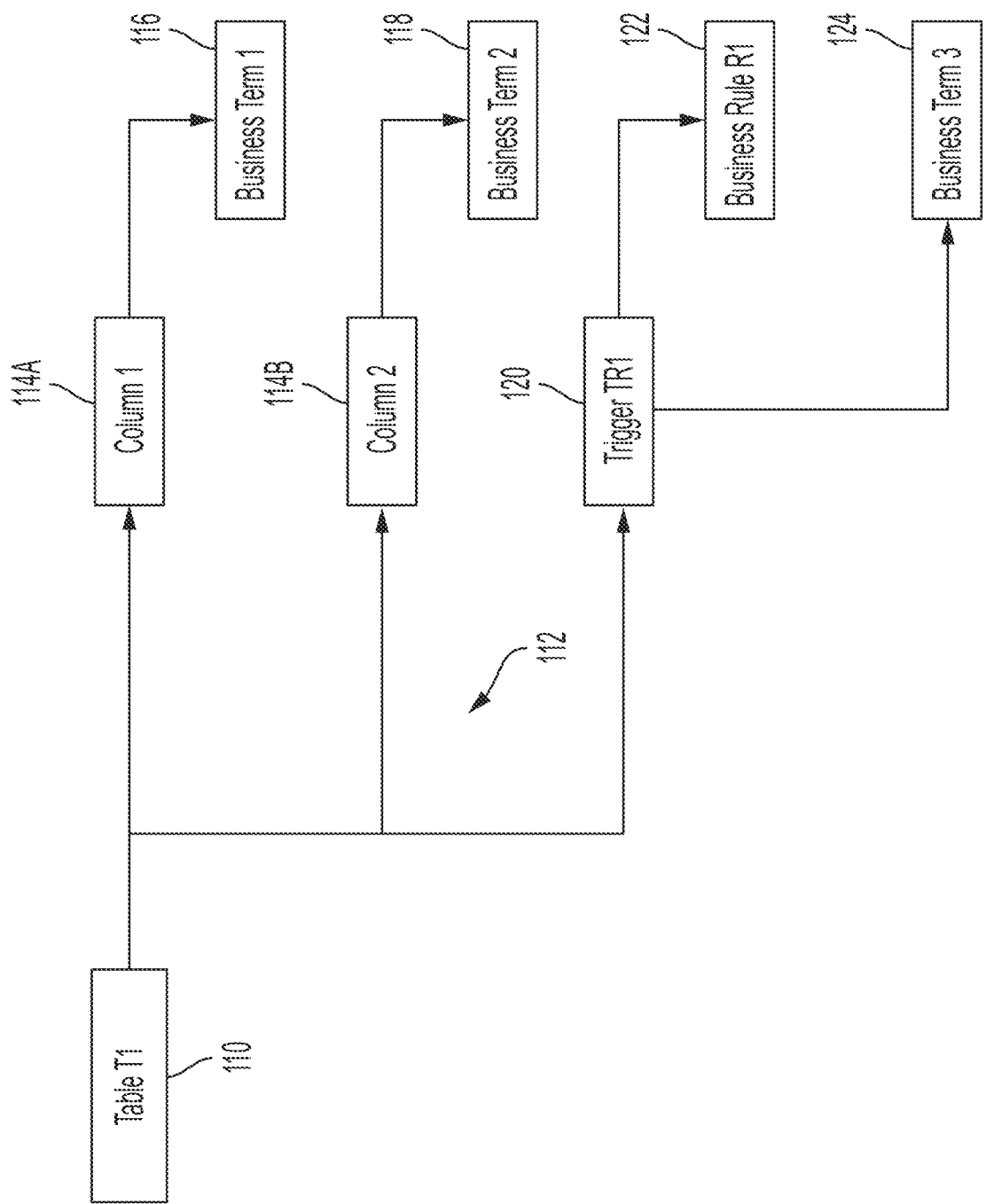
FIG. 5 is a schematic conceptual representation of the relationships between one or more data stores and business rules and terms as employed by the data identification system of FIG. 1 according to the teachings of the present invention.

The data identification system 10 can also determine the relationship and connections between a data store, such as a table, and business rules and business terms, as shown for example in the conceptual diagram of FIG. 5. The illustrated table 110 includes pointers 112 to the columns 114A, 114B of the table. The column 114A further includes data elements that correspond to the business term 116 and the column 114B includes data elements that correspond to the business term 118. Further, the table 110 can have associated therewith a trigger script 120, such as for example an ON DELETE or ON INSERT script. The trigger script 120 can be associated with one or more business rules 122 and business terms 124. In the case of other types of data stores, the columns can be implicit as the structure of data is described either in the definition of the data store, such as in extensible markup language (XML), or externally such as in data structures used when operating on a flat file structure.

Figure 6:
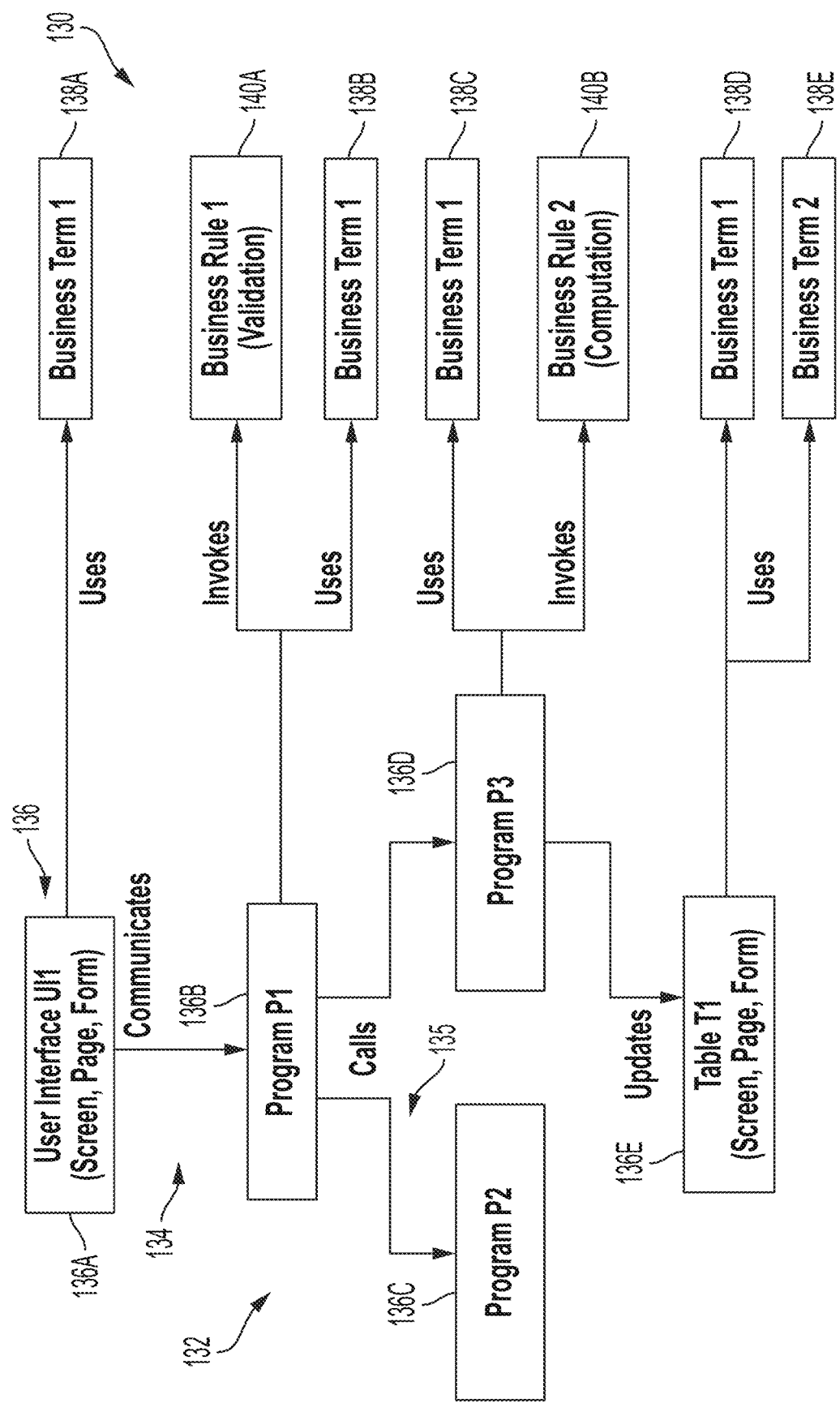
FIG. 6 is a schematic conceptual representation of an enriched architecture diagram generated by the data identification system of FIG. 1 according to the teachings of the present invention.

FIG. 6 is a schematic representation of an example enriched architecture diagram 130 that is generated by the enriched application architecture diagram unit 40 of the present invention. The enriched architecture diagram 130 includes an example architecture diagram 132 that is generated by the architecture diagram unit 32. The architecture diagram 132 can be enriched with business term data 30A generated by the term identification unit 30 and business rule data 28A generated by the rule identification unit 28, FIG. 1. The illustrated architecture diagram 132 includes an example data flow 134 that includes a series of programmatic boxes 136 representative of selected software artifacts that are linked together with communication arcs 135, as is known in the art. The arcs can include calls, updates, and the like. In the illustrated exemplary flow diagram 134, the boxes 136 include a user interface box 136A and a program P1 box 136B. The box 136B can branch into a pair of data flow legs that include a program P2 box 136C and a program P3 box 136D. The flow diagram further illustrates that the box 136D is linked to a table box 136E.

The enriched architecture diagram 130 shows the relationships between the architecture diagram 132 and selected business terms and business rules. For example, the box 136A can employ or be linked to a user interface that employs or uses business term 138A. The process box 136B can employ or be linked to a program that invokes the business rule 140A and uses business term 138B. Further, the box 136B can initiate a programmatic call to the program P2 box 136C and can initiate a programmatic call to the program P3 box 136D, which in turn uses business term 138C and invokes business rule 140B. The program P3 box in turn can update table box 136E, which in turn uses business terms 138D and 138E. The illustrated architecture diagram 132 thus shows the relationships between selected software artifacts, such as user interfaces and programs, between programs and programmatic calls, and between programs and data stores, such as tables. The creation of the relationships between the software artifacts, such as the illustrated user interfaces, programs data stores and programs, and the business rules and terms is shown in part in FIGS. 3-5.

Further, as shown in FIG. 6, the relationships between the software artifacts and the business rules and the business terms can form part of the enriched architecture diagram 130. Some data stores, such as tables, can have trigger scripts associated therewith, which can be activated when data is updated, deleted or inserted. The scripts can also contain software code that implements one or more business rules. One or more columns of the table belonging to the data stores can also be implementations of one or more business terms. Thus, a particular data store (e.g., table) can trigger a selected business rule which fills, by way of illustrative example, a column "AGE" based on the value in a "BIRTHDATE" field or column, and can further contains columns which implement business terms such as "customer name" and "customer birthdate." The discovery of connections between software or technical artifacts (e.g., user interfaces, programs and stores) and business rules and business terms results in the enriched architecture diagram 130, which contains not only the relationships between software artifacts, but also between the artifacts and the business terms and rules.

Figure 7:
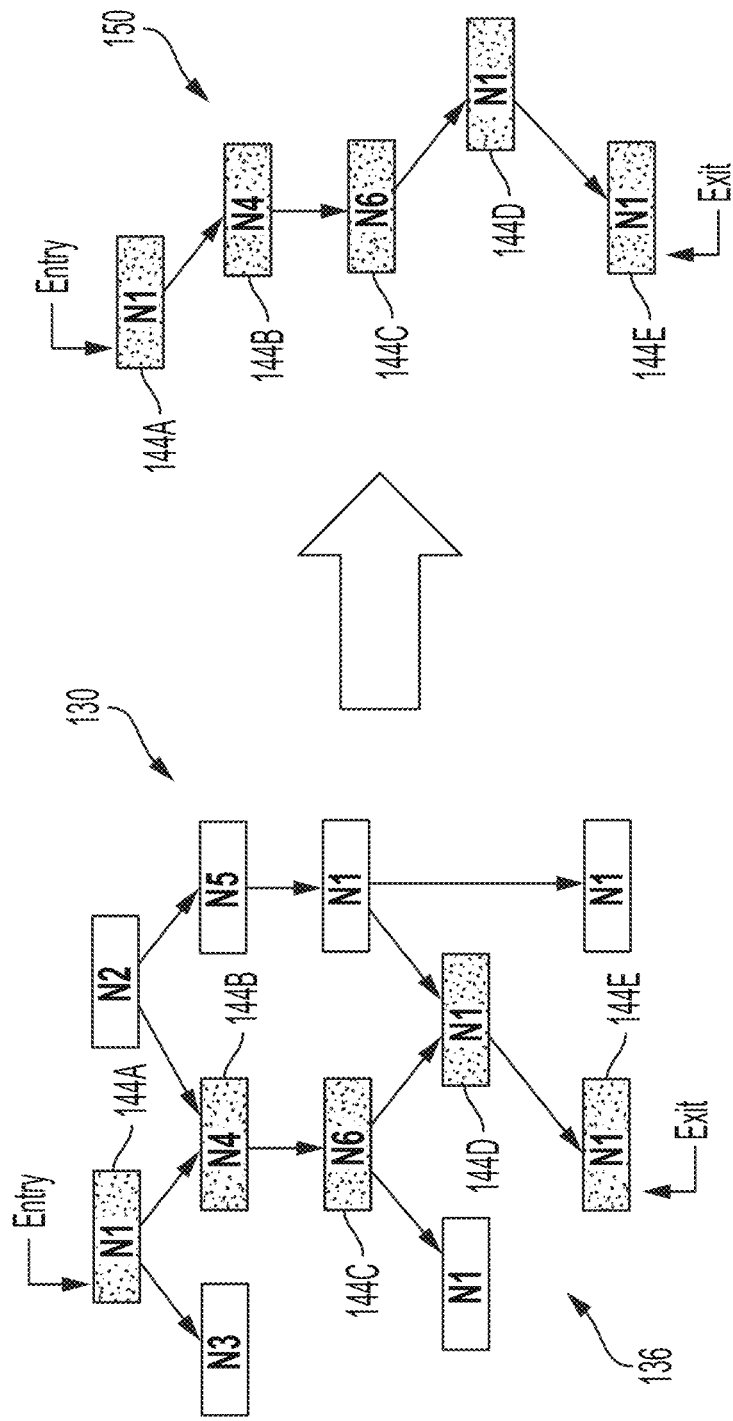
FIG. 7 is an illustrative schematic diagram illustrating the formation of a reduced architecture diagram from an enriched architecture diagram according to the teachings of the present invention.

FIG. 7 is a schematic illustrative example of the system 10 reducing the enriched architecture diagram 130 to a reduced architecture diagram 150 (e.g., term lineage diagram) that is representative of the flow or paths of a selected business term between software artifacts, such as user interfaces and data stores, containing the business terms within a software application. For example, FIG. 7 illustrates the enriched architecture diagram 130 that includes a plurality of programmatic boxes 136. An operator or end user of the system via the selected terms unit 42, FIG. 1, can select a business term from a displayed list of business terms. The term lineage determination unit 44 in response to the one or more business terms selected by the operator can generate the reduced architecture diagram 150. Specifically, once the operator selects the business term, the term lineage determination unit 44 determines the software artifacts or boxes that contain or implement the business term. That is, the term lineage determination unit 44 determines the common business term that is present within the highlighted boxes 136, such as the boxes represented by the highlighted boxes 144A-144E, of the enriched architecture diagram 130 generated by the enriched application architecture diagram unit 40. Once identified or determined by the term lineage determination unit 44, the unit 44 can generate or create the term lineage diagram or reduced architecture diagram 150. As such, the reduced architecture diagram 150 represents the lineage of a business term that flows through boxes 144A-144E. While a full, complete enriched architecture diagram 130 may be quite large, consisting of thousands of software artifacts in the case of a large software application, only certain artifacts in the reduced architecture diagram 150 are related to the selected business terms. Those of ordinary skill in the art will readily recognize that the reduction of the enriched architecture diagram 130 to the reduced architecture diagram 150 is described herein in broad general points. The technique to reduce the diagram may consist of a number of steps, including first highlighting (e.g., marked as being of interest) the boxes representing the artifacts related to the desired business terms; second, detecting the entry points and exit points in the data flow or diagram, where the entry points are the colorized boxes representing the artifacts which do not have arcs into them from other colorized boxes and the exit points are those colorized boxes which do not have arcs to other colorized boxes; and then third, detecting all of the paths formed by the arcs which lead from the entry points to the exit points. The reduced architecture diagram 150 is typically the actual term lineage diagram and is then rendered in a graphical form to the operator. FIG. 7 illustrates this technique.

The rendition of the term lineage diagram 150 may be enhanced with additional functionality. According to one embodiment of the present invention, the business terms associated with each box can appear inside the box representing the technical artifact (e.g., user interface, program or data store). The name of the business rules may also appear inside the same box. In another embodiment, when a box representing a technical artifact is selected, the terms and rules involved are shown in a separate interface, such as a popup window or another pane on the same window.

Figure 8:
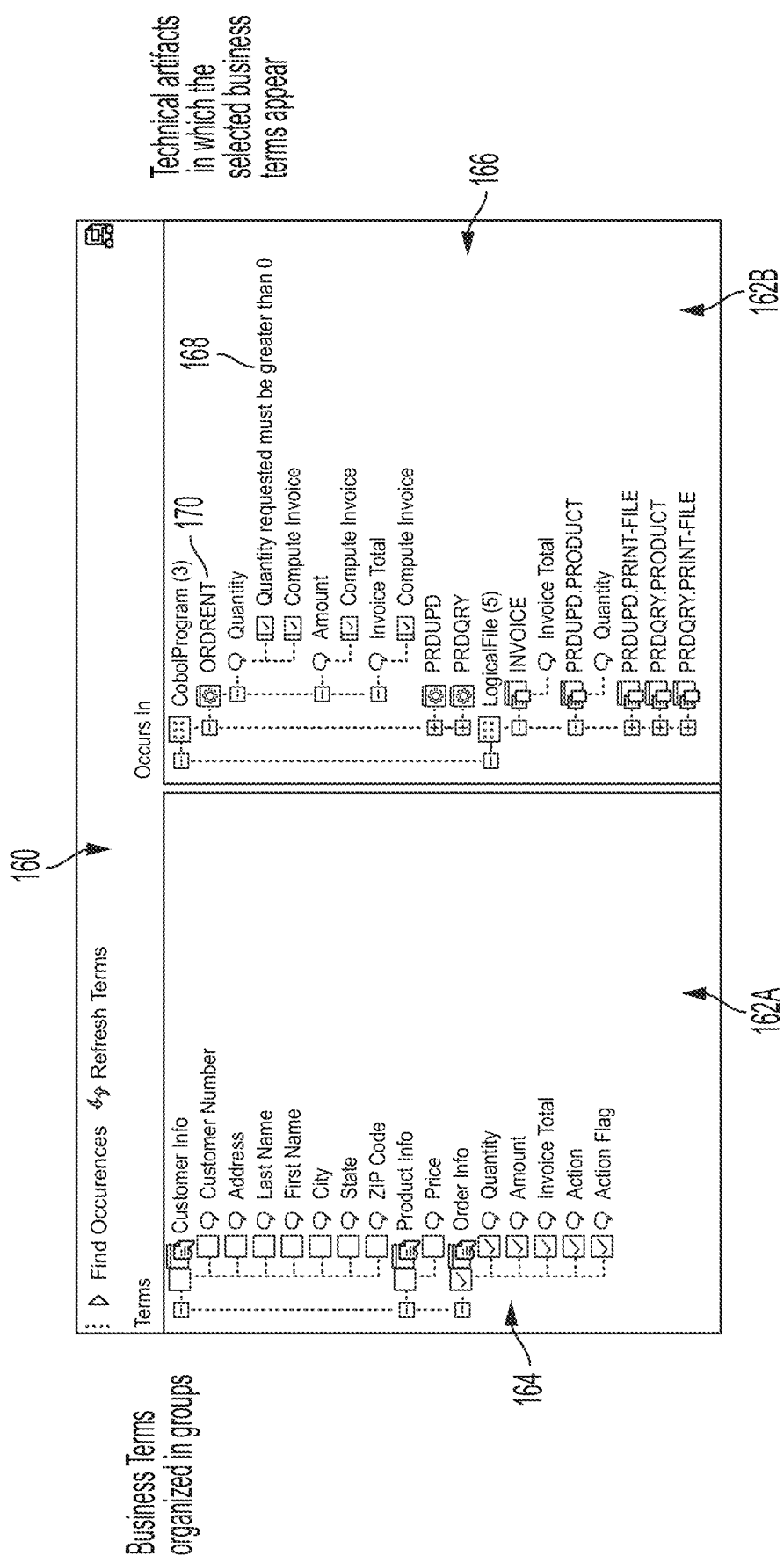
FIG. 8 is a schematic representation of a user interface generated by the system of the present invention when an operator selects one or more business terms and the system generates a term lineage diagram according to the teachings of the present invention.

FIG. 8 is a user interface 160 that can be generated by the user interface generator 46 or by the term lineage determination unit 44 according to the teachings of the present invention. The user interface 160 can have pane elements 162A, 162B for displaying selected information to the operator. For example, the pane element 162A can display a list of business terms 164 that are organized into groups, where the business terms are identified by the term identification unit 30. For example, the business term group "Order Info" can include a list of business terms 164 that includes, for example, the terms Quantity, Amount, Invoice Total, Action, and Action Flag.

The pane element 162A can be interactive and can allow the operator to open the window or pane that displays the business term list 164. The pane element 162B can display a list of software artifacts (e.g., user interfaces, programs, and data stores) 166 to the operator. The artifact list 166 can set forth business rules 168 that are implemented by the selected artifacts 170 in the list 166. The operator can select the business terms or rules that are employed by the term lineage determination unit 44 to generate the reduced architecture diagram 150.

Figure 9:
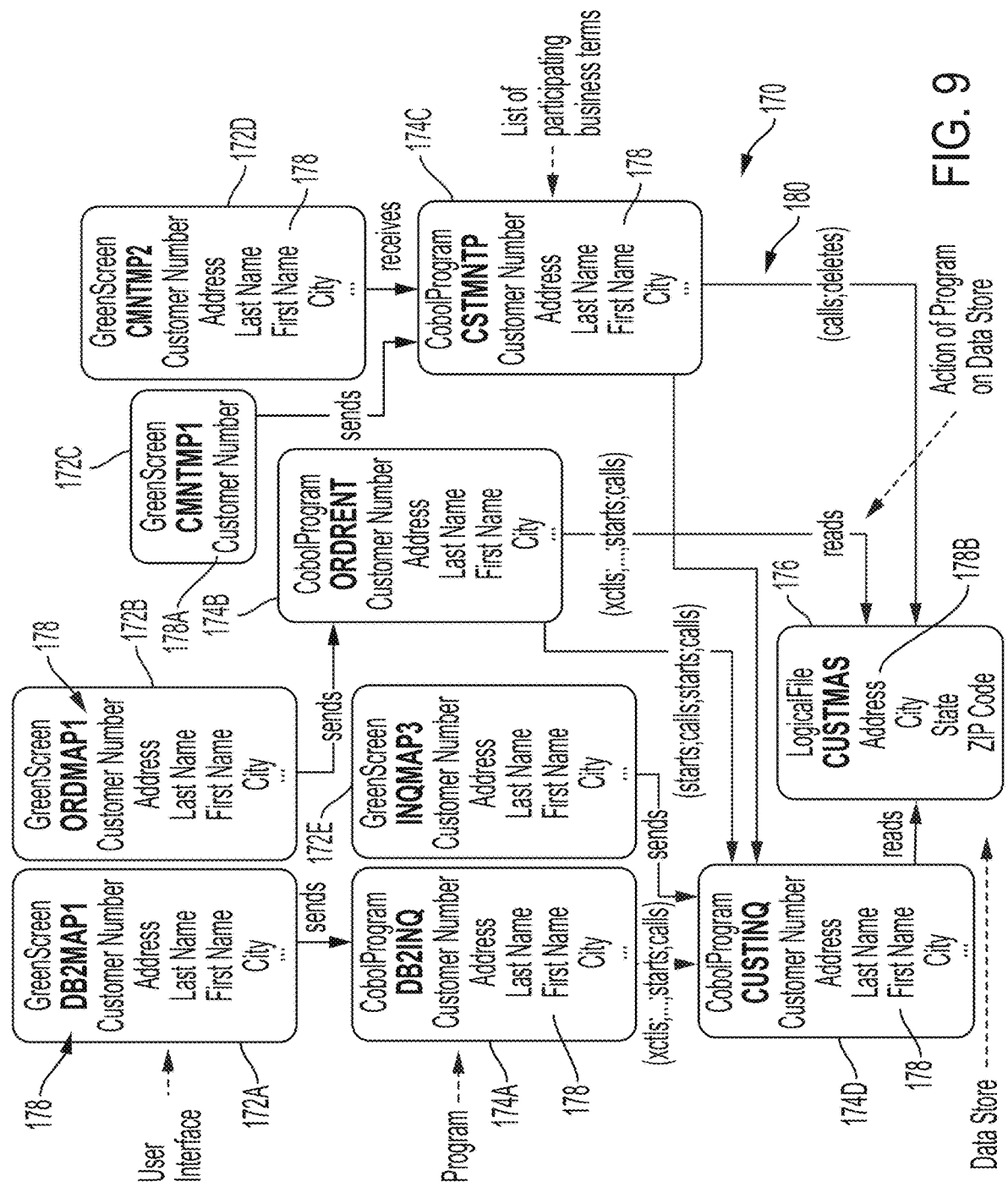
FIG. 9 is an illustrative example of a term lineage diagram according to the teachings of the present invention.

FIG. 9 is a schematic representation of another example of an enriched architecture diagram that can be created by the enriched application architecture diagram unit 44 according to the teachings of the present invention. When particular business terms are selected by the end user or operator, then the term lineage determination unit 44 can generate a term lineage diagram from the enriched architecture diagram 170. The enriched architecture diagram 170 can include for example a series of programmatic boxes representative of software artifacts (e.g., user interfaces, programs and data stores) that have business terms 178 associated therewith, as well as the relationships between them (e.g., communication arcs 180), such as programs communicating with the screens, the programs accessing selected files, and the like. In the illustrated enriched architecture diagram 170, a user interface or screen box 172A can include selected information, including the indicated business terms 178 (e.g., customer number, address, last name, first name, and city) that are communicated to the illustrated program box 174A. Likewise, the user interface box 172B that also has associated therewith a series of business terms 178 can communicate with a program box 174B by sending information thereto. The user interface boxes 172C and 172D also have business terms associated therewith, such as business terms 178A and 178, respectively, and can communicate with the program box 174C via the illustrated arcs 180. For example, the user interface box 172C can send information to the program box 174C. The business terms 178 are then communicated to the data store box 176 from the program boxes 174B and 174C. Similarly, the program box 174A and the user interface box 174E have business terms 178 associated therewith, and the boxes communicate with the program box 174D via the communication arcs 180. The program box 174D in turn communicates with the data store box 176. The data store box 176 has a selected collection of business terms 178B associated therewith. The flow or path of the business terms through the enriched architecture diagram is indicative of the flow of the illustrated business terms through the software application, and hence is indicative of the lineage of the terms.

It is to be understood that although the invention has been described above in terms of particular embodiments, the foregoing embodiments are provided as illustrative only, and do not limit or define the scope of the invention. Various other embodiments, including but not limited to those described herein are also within the scope of the claims. For example, elements, units, tools and components described herein may be further divided into additional components or joined together to form fewer components for performing the same functions.

Any of the functions disclosed herein may be implemented using means for performing those functions. Such means include, but are not limited to, any of the components or units disclosed herein, such as the electronic or computing device components described herein.

The techniques described above and below may be implemented, for example, in hardware, one or more computer programs tangibly stored on one or more computer-readable media, firmware, or any combination thereof. The techniques described above may be implemented in one or more computer programs executing on (or executable by) a programmable computer or electronic device having any combination of any number of the following: a processor, a storage medium readable and/or writable by the processor (including, for example, volatile and non-volatile memory and/or storage elements), an input device, an output device, and a display. Program code may be applied to input entered using the input device to perform the functions described and to generate output using the output device.

The term computing device or electronic device as used herein can refer to any device that includes a processor and a computer-readable memory capable of storing computer-readable instructions, and in which the processor is capable of executing the computer-readable instructions in the memory. The terms computer system and computing system refer herein to a system containing one or more computing devices.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention may operate on digital electronic processes which can only be created, stored, modified, processed, and transmitted by computing devices and other electronic devices. Such embodiments, therefore, address problems which are inherently computer-related and solve such problems using computer technology in ways which cannot be solved manually or mentally by humans.

Any claims herein which affirmatively require a computer, an electronic device, a processor, a memory, storage, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product or computer readable medium claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Embodiments of the present invention solve one or more problems that are inherently rooted in computer technology. For example, embodiments of the present invention solve the problem of how to determine the lineage of business terms and application interfaces between multiple software applications. There is no analog to this problem in the non-computer environment, nor is there an analog to the solutions disclosed herein in the non-computer environment.

Furthermore, embodiments of the present invention represent improvements to computer and communication technology itself. For example, the system 10 of the present can optionally employ a specially programmed or special purpose computer in an improved computer system, which may, for example, be implemented within a single computing device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements can also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

It should be appreciated that various concepts, systems and methods described above can be implemented in any number of ways, as the disclosed concepts are not limited to any particular manner of implementation or system configuration. Examples of specific implementations and applications are discussed below and shown in FIG. 10 primarily for illustrative purposes and for providing or describing the operating environment of the system of the present invention. The term lineage identification system 10 and/or elements or units thereof can employ one or more electronic or computing devices, such as one or more servers, clients, computers, laptops, smartphones and the like, that are networked together or which are arranged so as to effectively communicate with each other. The network can be any type or form of network. The devices can be on the same network or on different networks. In some embodiments, the network system may include multiple, logically-grouped servers. In one of these embodiments, the logical group of servers may be referred to as a server farm or a machine farm. In another of these embodiments, the servers may be geographically dispersed. The electronic devices can communicate through wired connections or through wireless connections. The clients can also be generally referred to as local machines, clients, client nodes, client machines, client computers, client devices, endpoints, or endpoint nodes. The servers can also be referred to herein as servers, server nodes, or remote machines. In some embodiments, a client has the capacity to function as both a client or client node seeking access to resources provided by a server or server node and as a server providing access to hosted resources for other clients. The clients can be any suitable electronic or computing device, including for example, a computer, a server, a smartphone, a smart electronic pad, a portable computer, and the like, such as the illustrated electronic or computing device 300. The system 10 or any associated units or components of the system 10 can employ one or more of the illustrated computing devices and can form a computing system. Further, the server may be a file server, application server, web server, proxy server, appliance, network appliance, gateway, gateway server, virtualization server, deployment server, SSL VPN server, or firewall, or any other suitable electronic or computing device, such as the electronic device 300. In one embodiment, the server may be referred to as a remote machine or a node. In another embodiment, a plurality of nodes may be in the path between any two communicating servers or clients. The term lineage identification system 10 which includes the data extraction unit 14, the storage unit 18, the application model unit 24, the rule identification unit 28, the term identification unit 30, the architecture diagram unit 32, the enriched application architecture diagram unit 40, the term lineage determination unit 44, and the user interface generator 46 (elements of the system) can be stored on or implemented by one or more of the electronic devices described herein (e.g., clients or servers), and the hardware associated with the electronic devices, such as the processor or CPU and memory described below.

Figure 10:
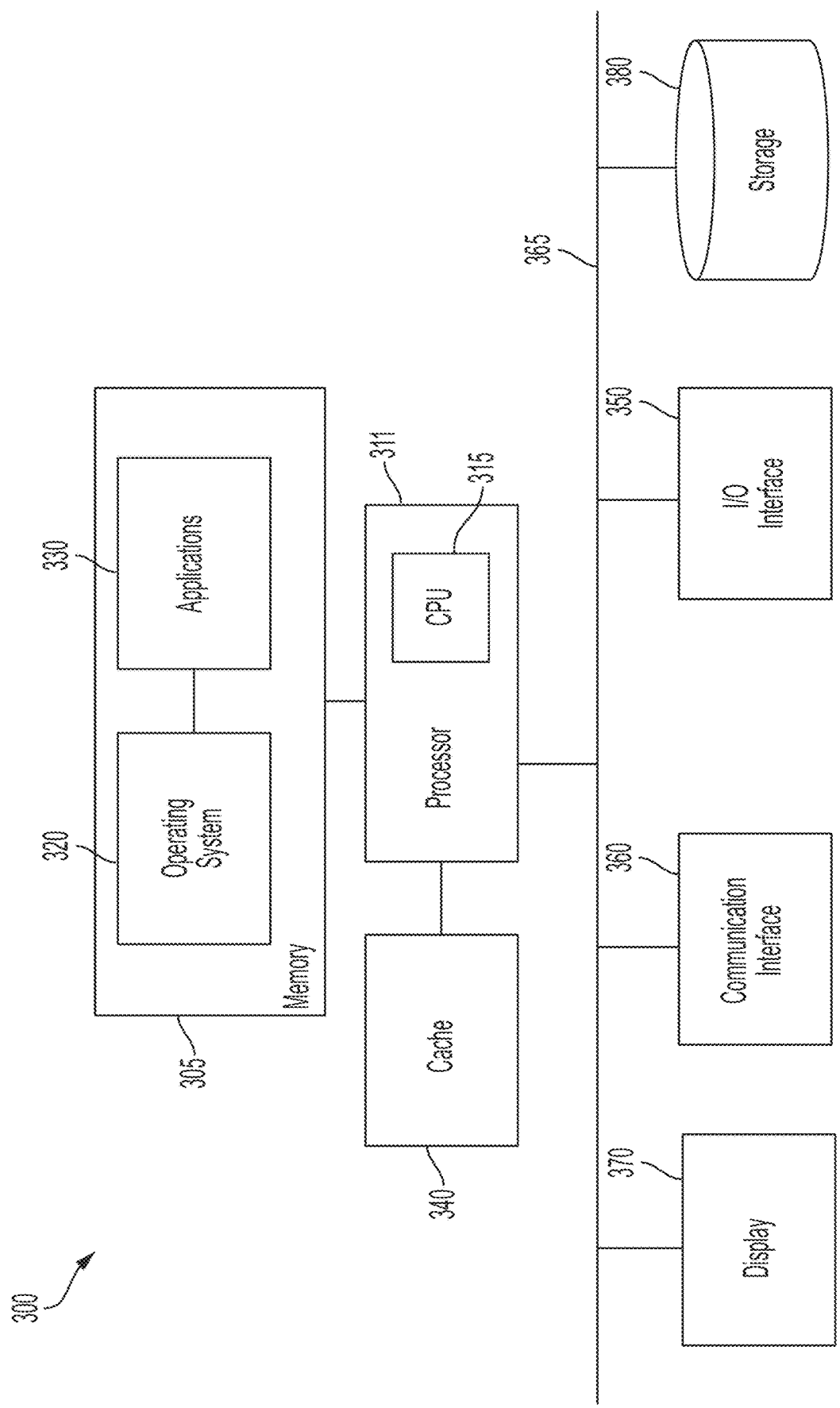
FIG. 10 is a schematic diagram of an electronic device and/or associated system suitable for implementing the process flow identification system of the present invention.

FIG. 10 is a high-level block diagram of an electronic or computing device 300 that can be used with the embodiments disclosed herein. Without limitation, the hardware, software, and techniques described herein can be implemented in digital electronic circuitry or in computer hardware that executes firmware, software, or combinations thereof. The implementation can include a computer program product (e.g., a non-transitory computer program tangibly embodied in a machine-readable storage device, for execution by, or to control the operation of, one or more data processing apparatuses, such as a programmable processor, one or more computers, one or more servers and the like).

The illustrated electronic device 300 can be any suitable electronic circuitry that includes a main memory unit 305 that is connected to a processor 311 having a CPU 315 and a cache unit 340 configured to store copies of the data from the most frequently used main memory 305. The electronic device can implement the process flow identification system 10 or one or more elements of the process flow identification system.

Further, the methods and procedures for carrying out the methods disclosed herein can be performed by one or more programmable processors executing a computer program to perform functions of the invention by operating on input data and generating output. Further, the methods and procedures disclosed herein can also be performed by, and the apparatus disclosed herein can be implemented as, special purpose logic circuitry, such as a FPGA (field programmable gate array) or an ASIC (application specific integrated circuit). Modules and units disclosed herein can also refer to portions of the computer program and/or the processor/special circuitry that implements that functionality.

The processor 311 is any logic circuitry that responds to, processes or manipulates instructions received from the main memory unit, and can be any suitable processor for execution of a computer program. For example, the processor 311 can be a general and/or special purpose microprocessor and/or a processor of a digital computer. The CPU 315 can be any suitable processing unit known in the art. For example, the CPU 315 can be a general and/or special purpose microprocessor, such as an application-specific instruction set processor, graphics processing unit, physics processing unit, digital signal processor, image processor, coprocessor, floating-point processor, network processor, and/or any other suitable processor that can be used in a digital computing circuitry. Alternatively or additionally, the processor can comprise at least one of a multi-core processor and a front-end processor. Generally, the processor 311 can be embodied in any suitable manner. For example, the processor 311 can be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. Additionally or alternatively, the processor 311 can be configured to execute instructions stored in the memory 305 or otherwise accessible to the processor 311. As such, whether configured by hardware or software methods, or by a combination thereof, the processor 311 can represent an entity (e.g., physically embodied in circuitry) capable of performing operations according to embodiments disclosed herein while configured accordingly. Thus, for example, when the processor 311 is embodied as an ASIC, FPGA or the like, the processor 311 can be specifically configured hardware for conducting the operations described herein. Alternatively, as another example, when the processor 311 is embodied as an executor of software instructions, the instructions can specifically configure the processor 311 to perform the operations described herein. In many embodiments, the central processing unit 530 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The processor can be configured to receive and execute instructions received from the main memory 305.

The electronic device 300 applicable to the hardware of the present invention can be based on any of these processors, or any other processor capable of operating as described herein. The central processing unit 315 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

The processor 311 and the CPU 315 can be configured to receive instructions and data from the main memory 305 (e.g., a read-only memory or a random access memory or both) and execute the instructions. The instructions and other data can be stored in the main memory 305. The processor 311 and the main memory 305 can be included in or supplemented by special purpose logic circuitry. The main memory unit 305 can include one or more memory chips capable of storing data and allowing any storage location to be directly accessed by the processor 311. The main memory unit 305 may be volatile and faster than other memory in the electronic device, or can dynamic random access memory (DRAM) or any variants, including static random access memory (SRAM), Burst SRAM or Synch-Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 305 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 305 can be based on any of the above described memory chips, or any other available memory chips capable of operating as described herein. In the embodiment shown in FIG. 4, the processor 311 communicates with main memory 305 via a system bus 365. The computer executable instructions of the present invention may be provided using any computer-readable media that is accessible by the computing or electronic device 300. Computer-readable media may include, for example, the computer memory or storage unit 305. The computer storage media may also include, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer readable storage media does not include communication media. Therefore, a computer storage or memory medium should not be interpreted to be a propagating signal per se or stated another transitory in nature. The propagated signals may be present in a computer storage media, but propagated signals per se are not examples of computer storage media, which is intended to be non-transitory. Although the computer memory or storage unit 305 is shown within the computing device 300 it will be appreciated that the storage may be distributed or located remotely and accessed via a network or other communication link.

The main memory 305 can comprise an operating system 320 that is configured to implement various operating system functions. For example, the operating system 320 can be responsible for controlling access to various devices, memory management, and/or implementing various functions of the asset management system disclosed herein. Generally, the operating system 320 can be any suitable system software that can manage computer hardware and software resources and provide common services for computer programs.

The main memory 305 can also hold application software 330. For example, the main memory 305 and application software 330 can include various computer executable instructions, application software, and data structures, such as computer executable instructions and data structures that implement various aspects of the embodiments described herein. For example, the main memory 305 and application software 330 can include computer executable instructions, application software, and data structures, such as computer executable instructions and data structures that implement various aspects of the content characterization systems disclosed herein, such as processing and capture of information. Generally, the functions performed by the content characterization systems disclosed herein can be implemented in digital electronic circuitry or in computer hardware that executes software, firmware, or combinations thereof. The implementation can be as a computer program product (e.g., a computer program tangibly embodied in a non-transitory machine-readable storage device) for execution by or to control the operation of a data processing apparatus (e.g., a computer, a programmable processor, or multiple computers). Generally, the program codes that can be used with the embodiments disclosed herein can be implemented and written in any form of programming language, including compiled or interpreted languages, and can be deployed in any form, including as a stand-alone program or as a component, module, subroutine, or other unit suitable for use in a computing environment. A computer program can be configured to be executed on a computer, or on multiple computers, at one site or distributed across multiple sites and interconnected by a communications network, such as the Internet.

The processor 311 can further be coupled to a database or data storage 380. The data storage 380 can be configured to store information and data relating to various functions and operations of the content characterization systems disclosed herein. For example, as detailed above, the data storage 380 can store information including but not limited to captured information, multimedia, processed information, and characterized content.

A wide variety of I/O devices may be present in or connected to the electronic device 300. For example, the electronic device can include a display 370, and as previously described, the visual application unit 28 or one or more other elements of the system 10 can include the display. The display 370 can be configured to display information and instructions received from the processor 311. Further, the display 370 can generally be any suitable display available in the art, for example a Liquid Crystal Display (LCD), a light emitting diode (LED) display, digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays, or electronic papers (e-ink) displays. Furthermore, the display 370 can be a smart and/or touch sensitive display that can receive instructions from a user and forwarded the received information to the processor 311. The input devices can also include user selection devices, such as keyboards, mice, trackpads, trackballs, touchpads, touch mice, multi-touch touchpads, touch mice and the like, as well as microphones, multi-array microphones, drawing tablets, cameras, singlelens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. The output devices can also include video displays, graphical displays, speakers, headphones, inkjet printers, laser printers, and 3D printers.

The electronic device 300 can also include an Input/Output (I/O) interface 350 that is configured to connect the processor 311 to various interfaces via an input/output (I/O) device interface 380. The device 300 can also include a communications interface 360 that is responsible for providing the circuitry 300 with a connection to a communications network (e.g., communications network 120). Transmission and reception of data and instructions can occur over the communications network.

The invention claimed is:

1. A system for associating one or more business terms with an architecture of a software application, comprising
   a data source for storing source code data associated with the software application,
   a data extraction unit for extracting data, including a plurality of software artifacts, from the source code data to form extracted data,
   an application model unit for generating an application model that includes a representation of selected data components of the extracted data and for generating application model data from the application model,
   a storage unit for storing the extracted data and for providing the extracted data to the application model unit, wherein the storage unit includes a knowledge repository for storing selected information about the software application,
   a term identification unit for identifying from the application model data a plurality of business terms and generating business term data,
   wherein the term identification unit identifies one or more data elements indicative of the plurality of business terms in the software application from the application model data and then organizes the data elements into one or more groups in which all of the data elements in each of the plurality of groups refer to a similar concept,
   an architecture diagram unit for generating an architecture diagram of each of the a plurality of software artifacts of the software application, wherein the architecture diagram includes a diagrammatic representation of relationships between any combination of a plurality of the software artifacts,
   an enriched application architecture diagram unit for generating based on the architecture diagram and the business term data an enriched architecture diagram, wherein the enriched architecture diagram includes the architecture diagram and one or more of the plurality of business terms,
   a selected terms unit for allowing a user to select one or more business terms from the plurality of business terms, and
   a term lineage determination unit for determining a lineage in the software artifacts of the selected one or more business terms based on the enriched architecture diagram and the selected business term and generating a term lineage diagram,
   wherein the lineage is representative of one or more data paths associated with the selected business term moving through the software artifacts.

2. The system of claim 1, further comprising a rule identification unit for identifying from the application model data a plurality of business rules associated with the software application and generating business rule data, wherein the enriched application architecture diagram unit generates the enriched architecture diagram based on the architecture diagram, the business term data and the business rule data.

3. The system of claim 2, wherein the business rule identification unit analyzes the application model data to identify selected snippets of code of the source code data which implement the plurality of business rules, and then mark the snippets of code as an embodiment of the business rules.

4. The system of claim 1, wherein the storage unit further comprises a database for storing the extracted data.

5. The system of claim 1, wherein the representation of the selected data components of the application model includes entities, relationships and associated attributes that describe a functionality of the data components in connection with the software application.

6. The system of claim 5, wherein the entities include programs, classes, statements, data elements, tables, columns, or screens, and wherein the attributes include associated identifying information that further specify the entity.

7. The system of claim 1, wherein the term identification unit identifies selected ones of the data components in the application model data, organizes the data components into a plurality of groups in which all elements of a group refer to the same concept, and associates each of the plurality of groups with a selected business term.

8. The system of claim 7, wherein the architecture diagram unit employs selected portions of the application model data to generate therefrom one or more of the architecture diagrams that indicate the relationship between the software artifacts.

9. The system of claim 8, wherein the enriched application diagram further comprises information about the relationships between one or more of the software artifacts and the plurality of business terms.

10. The system of claim 9, wherein the enriched application architecture diagram unit or the term lineage determination unit generates a schematic diagram showing relationships between the software artifacts and the business terms.

11. The system of claim 10, wherein the architecture diagram includes a plurality of programmatic boxes representative of the software artifacts that are linked together by communication arcs representing relationships between the software artifacts.

12. The system of claim 11, wherein one or more of the plurality of programmatic boxes are linked to at least one of a user interface, a program, or a data store that employs one of the plurality of business terms.

13. The system of claim 12, wherein the term lineage determination unit determines from the enriched architecture diagram a reduced architecture diagram that is representative of a path of the selected business term as the business term flows between software artifacts within the software application, wherein the reduced architecture diagram is representative of a lineage of the business term that flows through the software artifacts.

14. The system of claim 13, further comprising a user interface generator for generating a user interface for displaying a list of the business terms or a list of the software artifacts that implement the business terms.

15. A computer-implemented method for associating one or more business terms with an architecture of a software application, the method comprising executing a computer program having instructions that when executed by a computer processor for:

extracting providing extracted data, including a plurality of software artifacts, from source code data and extracted with a data extraction unit to form extracted data, generating an application model with an application model unit that includes a representation of selected data components of the extracted data and for generating application model data from the application model, storing the extracted data in a storage unit and providing the extracted data to the application model unit, wherein the storage unit includes a knowledge repository for storing selected information about the software application, identifying from the application model data a plurality of business terms and generating business term data using a term identification unit, wherein the term identification unit identifies one or more data elements indicative of the plurality of business terms in the software application from the application model data and then organizes the data elements into one or more groups in which all of the data elements in each of the plurality of groups refer to a similar concept, generating an architecture diagram of each of a the plurality of software artifacts of the software application using an architecture diagram unit, wherein the architecture diagram includes a diagrammatic representation of relationships between any combination of a plurality of the software artifacts, generating based on the architecture diagram and the business term data an enriched architecture diagram using an enriched application architecture diagram unit, wherein the enriched architecture diagram includes the architecture diagram and one or more of the plurality of business terms, allowing a user to select one or more business terms from the plurality of business terms with a selected terms unit, and determining a lineage in the software artifacts of the selected one or more business terms based on the enriched architecture diagram and the selected business term using a term lineage determination unit, wherein the lineage is representative of one or more data paths associated with the selected business term moving through the software artifacts, and generating a term lineage diagram.

16. The method of claim 15, further comprising identifying from the application model data a plurality of business rules associated with the software application with a rule identification unit and then generating business rule data, wherein the enriched application architecture diagram unit generates the enriched architecture diagram based on the architecture diagram, the business term data and the business rule data.

17. The method of claim 16, further comprising analyzing, with the business rule identification unit, the application model data to identify selected snippets of code of the source code data which implement the plurality of business rules, and marking the snippets of code as an embodiment of the business rules.

18. The method of claim 15, further comprising storing the extracted data and providing the extracted data to the application model unit with a storage unit, wherein the storage unit further comprises a database for storing the extracted data.

19. The method of claim 15, wherein the representation of the selected data components of the application model includes entities, relationships and associated attributes that describe a functionality of the data components in connection with the software application.

20. The method of claim 19, wherein the entities include programs, classes, statements, data elements, tables, columns, or screens, and wherein the attributes include associated identifying information that further specify the entity.

21. The method of claim 15, wherein, with the term identification unit, identifying selected ones of the data components in the application model data, organizing the data components into a plurality of groups in which all elements of a group refer to the same concept, and associating each of the plurality of groups with a selected business term.

22. The method of claim 15, further comprising employing, with the architecture diagram unit, selected portions of the application model data to generate therefrom one or more of the architecture diagrams that indicate the relationship between the software artifacts.

23. The method of claim 22, wherein the enriched application diagram further comprises information about the relationships between one or more of the software artifacts and the plurality of business terms.

24. The method of claim 23, further comprising generating, with the enriched application architecture diagram unit or the term lineage determination unit, a schematic diagram showing relationships between the software artifacts and the business terms.

25. The method of claim 24, wherein the architecture diagram includes a plurality of programmatic boxes representative of the software artifacts that are linked together by communication arcs representing relationships between the software artifacts.

26. The method of claim 25, further comprising linking one or more of the plurality of programmatic boxes to at least one of a user interface, a program, or a data store that employs one of the plurality of business terms.

27. The method of claim 26, further comprising determining from the enriched architecture diagram a reduced architecture diagram that is representative of a path of the selected business term as the business term flows between software artifacts within the software application, wherein the reduced architecture diagram is representative of a lineage of the business term that flows through the software artifacts.

28. The method of claim 27, further comprising generating with a user interface generator a user interface for displaying a list of the business terms or a list of the software artifacts that implement the business terms.

29. A non-transitory, computer readable medium comprising computer program instructions tangibly stored on the computer readable medium, wherein the computer program instructions are executable by at least one computer processor to perform a method, the method comprising extracting data, including a plurality of software artifacts, from source code data with a data extraction unit to form extracted data, generating an application model with an application model unit that includes a representation of selected data components of the extracted data and for generating application model data from the application model, storing the extracted data in a storage unit and providing the extracted data to the application model unit, wherein the storage unit includes a knowledge repository for storing selected information about the software application, identifying from the application model data a plurality of business terms and generating business term data using a term identification unit, wherein the term identification unit identifies one or more data elements indicative of the plurality of business terms in the software application from the application model data and then organizes the data elements into one or more groups in which all of the data elements in each of the plurality of groups refer to a similar concept, generating an architecture diagram of each of a plurality of software artifacts of the software application using an architecture diagram unit, wherein the architecture diagram includes a diagrammatic representation of relationships between any combination of a plurality of the software artifacts, generating based on the architecture diagram and the business term data an enriched architecture diagram using an enriched application architecture diagram unit, wherein the enriched architecture diagram includes the architecture diagram and one or more of the plurality of business terms, allowing a user to select one or more business terms from the plurality of business terms with a selected terms unit, and determining a lineage in the software artifacts of the selected one or more business terms based on the enriched architecture diagram and the selected business term using a term lineage determination unit, wherein the lineage is representative of one or more data paths associated with the selected business term moving through the software artifacts, and generating a term lineage diagram.

30. The computer readable medium of claim 29, further comprising identifying from the application model data a plurality of business rules associated with the software application with a rule identification unit and then generating business rule data, wherein the enriched application architecture diagram unit generates the enriched architecture diagram based on the architecture diagram, the business term data and the business rule data.

31. The computer readable medium of claim 30, further comprising analyzing, with the business rule identification unit, the application model data to identify selected snippets of code of the source code data which implement the plurality of business rules, and marking the snippets of code as an embodiment of the business rules.

32. The computer readable medium of claim 29, wherein the storage unit comprises a database for storing the extracted.

33. The computer readable medium of claim 29, wherein the representation of the selected data components of the application model includes entities, relationships and associated attributes that describe a functionality of the data components in connection with the software application.

34. The computer readable medium of claim 33, wherein the entities include programs, classes, statements, data elements, tables, columns, or screens, and wherein the attributes include associated identifying information that further specify the entity.

35. The computer readable medium of claim 29, wherein, with the term identification unit, identifying selected ones of the data components in the application model data, organizing the data components into a plurality of groups in which all elements of a group refer to the same concept, and associating each of the plurality of groups with a selected business term.

36. The computer readable medium of claim 29, further comprising employing, with the architecture diagram unit, selected portions of the application model data to generate therefrom one or more of the architecture diagrams that indicate the relationship between the software artifacts.

37. The computer readable medium of claim 36, wherein the enriched application diagram further comprises information about the relationships between one or more of the software artifacts and the plurality of business terms.

38. The computer readable medium of claim 37, further comprising generating, with the enriched application architecture diagram unit or the term lineage determination unit, a schematic diagram showing relationships between the software artifacts and the business rules.

39. The computer readable medium of claim 29, wherein the architecture diagram includes a plurality of programmatic boxes representative of the software artifacts that are linked together by communication arcs representing relationships between the software artifacts.

40. The computer readable medium of claim 39, further comprising linking one or more of the plurality of programmatic boxes to at least one of a user interface, a program, or a data store that employs one of the plurality of business terms.

41. The computer readable medium of claim 40, further comprising determining from the enriched arhitecture diagram a reduced architecture diagram that is representative of a path of the selected business term as the business term flows between software artifacts within the software application, wherein the reduced architecture diagram is representative of a lineage of the business term that flows through the software artifacts.

42. The computer readable medium of claim 41, further comprising generating with a user interface generator a user interface for displaying a list of the business terms or a list of the software artifacts that implement the business terms.

* * * * *